（12）United States Patent
Feng et al.

(10) Patent No.: US 12,219,273 B2
(45) Date of Patent: Feb. 4, 2025

(54) CAMERA MODULE, CAMERA, TERMINAL DEVICE, AND METHOD FOR DETERMINING IMAGE INFORMATION

(71) Applicant: HUAWEI TECHNOLOGIES CO., LTD., Guangdong (CN)

(72) Inventors: Jun Feng, Shenzhen (CN); Ming Li, Shenzhen (CN); Wenzhe Liao, Wuhan (CN); Hui Yang, Beijing (CN); Jinghui Xu, Shenzhen (CN); Jifang He, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 17/732,109

(22) Filed: Apr. 28, 2022

(65) Prior Publication Data

US 2022/0256128 A1 Aug. 11, 2022

Related U.S. Application Data

(63) Continuation of application No. PCT/CN2020/114434, filed on Sep. 10, 2020.

(30) Foreign Application Priority Data

Nov. 22, 2019 (CN) .......................... 201911159781.8

(51) Int. Cl.
 *H04N 25/13* (2023.01)
 *H04N 23/55* (2023.01)
(52) U.S. Cl.
 CPC ........... *H04N 25/135* (2023.01); *H04N 23/55* (2023.01)

(58) Field of Classification Search
 CPC ...... H04N 25/135; H04N 23/55; H04N 23/54; H04N 25/131; H04N 25/133; H04N 25/48; H04N 23/57; H04N 25/11
 See application file for complete search history.

(56) References Cited

U.S. PATENT DOCUMENTS

| 10,072,970 B1 * | 9/2018 | Twede | .................. H04N 23/54 |
| 10,178,360 B2 * | 1/2019 | Tanaka | ................ H04N 25/135 |
| 10,249,021 B2 * | 4/2019 | Tang | .................... H04N 23/843 |

(Continued)

FOREIGN PATENT DOCUMENTS

| CN | 101119445 A | 2/2008 |
| CN | 204479784 U | 7/2015 |

(Continued)

*Primary Examiner* — Shahbaz Nazrul

(57) ABSTRACT

A camera module is provided. The camera module may be separately used as a camera, or may be applied to a terminal device such as a mobile phone or a tablet computer, or a vehicle-mounted device. The camera module includes an optical lens component, a light filtering layer, an image sensor and a drive module. The optical lens component is configured to receive a light beam from a photographed object, and transmit the light beam to the light filtering layer. The light filtering layer is configured to move a position under the drive of the drive module, and respectively transmit light signals filtered at different positions to the image sensor. The image sensor is configured to receive the light signals at the different positions from the light filtering layer, and determine image information based on the light signals at the different positions.

19 Claims, 23 Drawing Sheets

(56) References Cited

U.S. PATENT DOCUMENTS

| | | | | |
|---|---|---|---|---|
| 10,432,904 | B2* | 10/2019 | Kim | H04N 23/57 |
| 2008/0030803 | A1* | 2/2008 | Min | H04N 1/02805 |
| | | | | 358/483 |
| 2012/0105691 | A1 | 5/2012 | Waqas et al. | |
| 2014/0091419 | A1 | 4/2014 | Hasegawa et al. | |
| 2015/0334357 | A1* | 11/2015 | Wang | H04N 25/135 |
| | | | | 348/278 |
| 2017/0338265 | A1* | 11/2017 | Yoshiba | H04N 25/76 |
| 2018/0160040 | A1* | 6/2018 | Shabtay | G06T 7/337 |

FOREIGN PATENT DOCUMENTS

| | | |
|---|---|---|
| CN | 105100558 A | 11/2015 |
| CN | 105611123 A | 5/2016 |
| CN | 106412389 A | 2/2017 |
| CN | 106412533 A | 2/2017 |
| CN | 107144937 A | 9/2017 |
| CN | 108332855 A | 7/2018 |
| JP | H1028697 A | 2/1998 |
| JP | 2003163940 A | 6/2003 |
| WO | 2019215986 A1 | 11/2019 |

\* cited by examiner

| R light filter | G light filter |
|---|---|
| W light filter | B light filter |

FIG. 4d

| R light filter | G light filter | B light filter |
|---|---|---|
| W light filter | W_ light filter | IR light filter |

FIG. 4e

| R light filter | Y light filter | B light filter |
|---|---|---|
| W light filter | W_ light filter | IR light filter |

FIG. 4f

| R light filter | Y light filter | R light filter | Y light filter |
|---|---|---|---|
| Y light filter | B light filter | Y light filter | B light filter |
| R light filter | G light filter | R light filter | G light filter |
| Y light filter | B light filter | Y light filter | B light filter |

FIG. 5b

| R light filter | Y light filter | R light filter | Y light filter |
|---|---|---|---|
| W light filter | B light filter | W light filter | B light filter |
| R light filter | G light filter | R light filter | G light filter |
| W light filter | B light filter | W light filter | B light filter |

FIG. 5c

| R light filter | G light filter | R light filter | G light filter |
|---|---|---|---|
| W light filter | B light filter | W light filter | B light filter |
| R light filter | G light filter | R light filter | G light filter |
| W light filter | B light filter | W light filter | B light filter |

FIG. 5d

| R light filter | G light filter | B light filter | R light filter | G light filter | B light filter |
|---|---|---|---|---|---|
| W light filter | W_ light filter | IR light filter | W light filter | W_ light filter | IR light filter |
| R light filter | G light filter | B light filter | R light filter | G light filter | B light filter |
| W light filter | W_ light filter | IR light filter | W light filter | W_ light filter | IR light filter |

FIG. 5e

| R light filter | Y light filter | B light filter | R light filter | Y light filter | B light filter |
|---|---|---|---|---|---|
| W light filter | W_ light filter | IR light filter | W light filter | W_ light filter | IR light filter |
| R light filter | Y light filter | B light filter | R light filter | Y light filter | B light filter |
| W light filter | W_ light filter | IR light filter | W light filter | W_ light filter | IR light filter |

FIG. 5f

| R light filter | R light filter | R light filter |
|---|---|---|
| G light filter | G light filter | G light filter |
| B light filter | B light filter | B light filter |

FIG. 5g

| R light filter | G light filter | B light filter | R light filter | G light filter | B light filter |
|---|---|---|---|---|---|
| G light filter | B light filter | R light filter | G light filter | B light filter | R light filter |
| B light filter | R light filter | G light filter | B light filter | R light filter | G light filter |
| R light filter | G light filter | B light filter | R light filter | G light filter | B light filter |
| G light filter | B light filter | R light filter | G light filter | B light filter | R light filter |
| B light filter | R light filter | G light filter | B light filter | R light filter | G light filter |

FIG. 5h

| R light filter | Y light filter | R light filter | Y light filter | R light filter | Y light filter |
|---|---|---|---|---|---|
| Particular light filter | B light filter | Y light filter | B light filter | Particular light filter | B light filter |
| R light filter | Y light filter | R light filter | Y light filter | R light filter | Y light filter |
| Y light filter | B light filter | Y light filter | B light filter | Y light filter | B light filter |
| Particular light filter | Y light filter | R light filter | Y light filter | Particular light filter | Y light filter |
| Y light filter | B light filter | Y light filter | B light filter | Y light filter | B light filter |

FIG. 5i

CAMERA MODULE, CAMERA, TERMINAL DEVICE, AND METHOD FOR DETERMINING IMAGE INFORMATION

CROSS-REFERENCE TO RELATED APPLICATIONS

This application is a continuation of International Application No. PCT/CN2020/114434, filed on Sep. 10, 2020, which claims priority to Chinese Patent Application No. 201911159781.8, filed on Nov. 22, 2019. The disclosures of the aforementioned applications are hereby incorporated by reference in their entireties.

TECHNICAL FIELD

This application relates to the field of camera modules, and in particular, to a camera module, a camera, a terminal device, and a method for determining image information.

BACKGROUND

With the development of science and technology, terminal devices with a camera module have been widely applied. In the camera module, a maximum resolution of an image sensor, a size of a single photosensitive unit, accuracy of color reproduction, a dynamic range, and the like are important factors that affect image quality.

Currently, one photosensitive unit in the image sensor can receive only one fixed color (for example, a light beam in one color of red, yellow, green, and blue), while light in all the other colors is lost. Therefore, the complete tricolor of red (R), green (G), and blue (B) of the current photosensitive unit needs to be obtained by using a color guessing algorithm based on a color received by a photosensitive unit around the photosensitive unit. The color guessing algorithm may cause an inaccurate color collected by a photosensitive unit, resulting in a false color.

SUMMARY

This application provides a camera module, a camera, a terminal device, and a method for determining image information, to improve accuracy of light beam collection performed by a photosensitive unit on a photographed object.

According to a first aspect, this application provides a camera module. The camera module may include an optical lens component, a light filtering layer, an image sensor and a drive module. The optical lens component is configured to receive a light beam from a photographed object, and transmit the light beam to the light filtering layer. The light filtering layer is configured to move a position under the drive of the drive module, and respectively transmit light signals filtered at different positions to the image sensor. The image sensor is configured to receive the light signals at the different positions that are transmitted from the light filtering layer, and determine image information based on the light signals at the different positions.

In this application, the position of the light filtering layer is moved, so that light signals filtered at different spatial positions are respectively transmitted to the image sensor, and the image sensor may complete sampling at different physical spatial positions, thereby increasing a sampling frequency at a spatial position, and helping improve a resolution of an image of the photographed object.

With reference to the first aspect, the light filtering layer includes M light filtering units, one light filtering unit allows light signals within at least one wavelength range to be filtered, the image sensor includes N photosensitive units, one photosensitive unit corresponds to at least three different light filtering units, and both N and M are integers greater than 2. The light filtering unit is configured to move a position under the drive of the drive module to correspond to different photosensitive units, and respectively transmit filtered light signals to the different photosensitive units. The photosensitive unit is configured to: receive light signals respectively transmitted from the at least three corresponding different light filtering units, to obtain P light signals, and determine image information based on the P light signals, where P is an integer greater than 2, and wavelength ranges of at least three of the P light signals are different.

Based on this solution, the drive module drives the light filtering unit to move the position to correspond to different photosensitive units, so that one photosensitive unit may receive P real light signals transmitted from at least three corresponding light filtering units. Wavelength ranges of at least three of the P light signals are different. In other words, the photosensitive unit may obtain at least three real light signals within different wavelength ranges. Image information is determined based on the P light signals without a color guessing process, thereby helping improve accuracy of light beam collection performed by the photosensitive unit on the photographed object, and helping avoid a false color caused by color guessing. Further, if the at least three different light signals include a red light signal, a green light signal, and a blue light signal, the photosensitive unit may collect a full color from the photographed object.

In a possible implementation, the light filtering unit may include a light filter and a first lens, and the first lens is located on a surface that is of the light filter and that is opposite to the optical lens component. The first lens is configured to converge the light beam from the optical lens component, and transmit a converged light beam to the light filter. The light filter is configured to filter the converged light beam, and respectively transmit filtered light signals to the different photosensitive units.

To avoid as much as possible a "cross-color" problem caused because one light filter transmits a filtered light signal to two photosensitive units at a time when the light beam from the photographed object is input at a relatively large angle, light filters and first lenses are not all center-aligned. In an optional implementation, if the light filtering unit is located at a central position of the light filtering layer, a center of the first lens is aligned with a center of the light filter. If the light filtering unit is located in a region of the light filtering layer other than the central position, a first distance between the center of the light filtering layer and a center of the light filtering layer is greater than a second distance between the center of the first lens and the center of the light filtering layer.

Further, optionally, a difference between a first distance corresponding to a light filtering unit at a first position and a corresponding second distance is less than a difference between a first distance corresponding to a light filtering unit at a second position and a corresponding second distance. A distance between the first position and the center of the light filtering layer is less than a distance between the second position and the center of the light filtering layer.

In another possible implementation, the light filtering unit further includes a second lens, and the second lens is located on a surface that is of the light filter and that is opposite to the image sensor. In other words, the light filtering unit includes the light filter, the first lens, and the second lens. The second lens is configured to receive light signals from the light filter, converge the light signals, and respectively transmit converged light signals to the different photosensitive units.

Further, optionally, a center of the second lens is aligned with the center of the light filter.

In this application, the camera module may further include M collimation lenses, and one collimation lens corresponds to one first lens. In an optional implementation, the collimation lens may be located between the first lens and a photosensitive unit, and the collimation lens is configured to collimate a converged light signal from the first lens, and transmit collimated light to a corresponding photosensitive unit. In another possible implementation, the collimation lens may be located between the first lens and the optical lens component, and the collimation lens is configured to collimate the light beam from the optical lens component, and transmit collimated light to the first lens. With the collimation lens, an output light signal can be closer to parallel light.

In this application, an arrangement manner of light filters in at least three different light filtering units corresponding to one photosensitive unit may include any one of the following cases.

Case 1: One photosensitive unit corresponds to four light filtering units, light filters in the four light filtering units are RGGB, and RGGB form a 2*2 array.

Case 2: One photosensitive unit corresponds to four light filtering units, light filters in the four light filtering units are RYYB, and RYYB form a 2*2 array.

Based on the foregoing case 1 and case 2, one photosensitive unit may collect a full color, that is, a red light signal, a green light signal, and a blue light signal, from the photographed object without a color guessing process, thereby improving accuracy of light beam collection performed by the photosensitive unit on the photographed object.

Case 3: One photosensitive unit corresponds to four light filtering units, light filters in the four light filtering units are RGB white (white, W), and RGBW form a 2*2 array.

Case 4: One photosensitive unit corresponds to four light filtering units, light filters in the four light filtering units are RYBW, and RYBW form a 2*2 array.

Based on the foregoing case 3 and case 4, with a W light filter, in a scenario with relatively low ambient luminance, an amount of light entering the image sensor in the camera module can be increased for synthesis into a low-light image of higher quality.

Case 5: One photosensitive unit corresponds to six light filtering units, light filters in the six light filtering units are RGBWW-(NIR), and RGBWW-(NIR) form a 3*2 array or a 2*3 array.

Case 6: One photosensitive unit corresponds to six light filtering units, light filters in the six light filtering units are RYBWW-near-infrared (NIR), and RYBWW-(NIR) form a 3*2 array or a 2*3 array.

Based on the foregoing case 5 and case 6, a W light filter is disposed, so that in a scenario with relatively low ambient luminance, an amount of light entering the image sensor in the camera module can be increased. A W− light filter is disposed, so that based on a light attenuation characteristic of the W− light filter, an amount of light entering the image sensor in the camera module can be reduced in an extremely bright environment. A combination of the W light filter and the W− light filter can achieve dynamic range representation of a higher range in an environment with a high light ratio. A NIR light filter is disposed, so that a unique image in a NIR band can be obtained.

Case 7: One photosensitive unit corresponds to three light filtering units, light filters in the three light filtering units are RGB, and RGB form a 1*3 array or a 3*1 array.

Case 8: One photosensitive unit corresponds to three light filtering units, light filters in the three light filtering units are RYB, and RYB form a 1*3 array or a 3*1 array.

Based on the foregoing case 7 and case 8, the drive module may drive the light filtering layer to move the position in a direction perpendicular to a stripe formed by same light filters, so that one photosensitive unit may collect a full color, that is, a red light signal, a green light signal, and a blue light signal, from the photographed object without a color guessing process, thereby improving accuracy of light beam collection performed by the photosensitive unit on the photographed object, and helping reduce a time for image photographing by the camera module.

Case 9: Based on any one of the foregoing case 1 to case 8, the light filtering layer may further include particular light filters disposed according to a preset rule, and the particular light filters allow particular light signals to be filtered.

Further, optionally, the preset rule includes arrangement at equal intervals; or the preset rule includes that the light filtering layer is divided into at least two regions, arrangement is performed at equal intervals in each region, and intervals corresponding to the at least two regions are different or the same.

In an optional implementation, if the arrangement manner of the light filters in the at least three light filtering units is RGGB, RYYB, RGBW, RYBW, RGBWW-(NIR), or RYBWW-(NIR), the drive module is configured to drive the light filtering unit to switch between the different photosensitive units in a plane parallel to the image sensor and respectively along a row direction and a column direction of the array. If the arrangement manner of the light filters in the at least three light filtering units is RGB or RYB, the drive module is configured to drive the light filtering unit to switch between the different photosensitive units in a plane parallel to the image sensor and along a column direction or a row direction of the array.

With reference to the first aspect, the light filtering layer may include M light filtering units, one light filtering unit allows light signals within at least one wavelength range to be filtered, the image sensor includes N photosensitive units, one photosensitive unit corresponds to one light filtering unit, and both N and M are integers greater than 2. The light filtering unit is configured to move between K regions under the drive of the drive module, and transmit light signals at K different spatial positions that are obtained in the K regions to the corresponding photosensitive unit, where K is an integer greater than 1. The photosensitive unit is configured to receive the light signals at the K different spatial positions from the corresponding light filtering unit, and determine image information based on the light signals at the K different spatial positions.

Based on this solution, the light filtering unit moves between the K regions under the drive of the drive module, so that one photosensitive unit may receive light signals at K different spatial positions from a corresponding light filtering unit, thereby increasing a frequency of the photosensitive unit in light signal sampling at a spatial position, and helping improve a resolution of a formed image. In other words, the camera module may complete sampling at different physical spatial positions by using a same photosensitive unit, thereby increasing a sampling frequency at a spatial position, and helping improve a resolution of an image of the photographed object.

In an optional implementation, the light filtering unit is configured to: under the drive of the drive module, move between the K regions along a plane parallel to the image sensor, where a movement distance between two adjacent regions is less than a distance between geometric centers of two adjacent photosensitive units.

Further, optionally, K is a square of an integer greater than 1. The light filtering unit may be configured to: under the drive of the drive module, move between the K regions along the plane parallel to the image sensor, where the movement distance between two adjacent regions is less than or equal to $1/\sqrt{K}$ multiplied by a size of a photosensitive unit.

In an optional implementation, the light filtering unit includes a light filter and a first lens, and the first lens is located on a surface that is of the light filter and that is opposite to the optical lens component. Alternatively, it may be understood that the light filter is fixed to the first lens. The first lens is configured to converge the light beam from the optical lens component, and transmit a converged light beam to the light filter. The light filter is configured to filter the converged light beam from the first lens, and transmit filtered light signals to the corresponding photosensitive unit.

To avoid as much as possible a "cross-color" problem caused because one light filter transmits a filtered light signal to two photosensitive units at a time when the light beam from the photographed object is input at a relatively large angle, light filters and first lenses are not all center-aligned. In an optional implementation, if the light filtering unit is located at a central position of the light filtering layer, a center of the first lens is aligned with a center of the light filter. If the light filtering unit is located in a region of the light filtering layer other than the central position, a first distance between the center of the light filtering layer and a center of the light filtering layer is greater than a second distance between the center of the first lens and the center of the light filtering layer.

Further, optionally, a difference between a first distance corresponding to a light filtering unit at a first position and a corresponding second distance is less than a difference between a first distance corresponding to a light filtering unit at a second position and a corresponding second distance. A distance between the first position and the center of the light filtering layer is less than a distance between the second position and the center of the light filtering layer.

In an optional implementation, the camera module further includes a second lens, and the second lens is located on a surface that is of the light filter and that is opposite to the image sensor. In other words, the second lens is fixed to the light filter. The second lens is configured to receive light signals from the corresponding light filter, converge the light signals, and transmit converged light signals to the corresponding photosensitive unit.

Further, optionally, a center of the second lens is aligned with the center of the light filter.

With reference to the first aspect, the image sensor may be a black-and-white image sensor.

According to a second aspect, this application provides a camera module. The camera module includes an optical lens component, M first lenses, M light filters, an image sensor, and a drive module. One light filter allows light signals within at least one wavelength range to be filtered, the image sensor includes N photosensitive units, one first lens corresponds to one photosensitive unit, one photosensitive unit corresponds to one light filter, and both N and M are integers greater than 2. The optical lens component is configured to receive a light beam from a photographed object, and transmit the light beam to the M first lenses. The first lens is configured to converge the light beam from the optical lens component, move between K regions under the drive of the drive module, and transmit light signals at K different spatial positions that are obtained in the K regions to the corresponding light filter, where K is an integer greater than 1. The light filter is configured to filter the light signals from the corresponding first lens, and transmit filtered light signals to the corresponding photosensitive unit. The photosensitive unit is configured to receive the light signals at the K different spatial positions from the corresponding light filter, and determine image information based on the light signals at the K different spatial positions. Optionally, a quantity of photosensitive units is equal to a quantity of light filters.

Based on this solution, the first lens moves between the K regions under the drive of the drive module, so that one photosensitive unit may receive light signals at K different spatial positions from a corresponding light filter, thereby increasing a frequency of the photosensitive unit in light signal sampling at a spatial position, and helping improve a resolution of a formed image. In other words, the camera module may complete sampling at different physical spatial positions by using a same photosensitive unit, thereby increasing a sampling frequency at a spatial position, and helping improve a resolution of an image of the photographed object.

In an optional implementation, the first lens is configured to: under the drive of the drive module, move between the K regions along a plane parallel to the image sensor, where a movement distance between two adjacent regions is less than a distance between geometric centers of two adjacent photosensitive units.

Further, optionally, K is a square of an integer greater than 1. The first lens may be configured to: under the drive of the drive module, move between the K regions along the plane parallel to the image sensor, where the movement distance between two adjacent regions is less than or equal to $1/\sqrt{K}$ multiplied by a size of a photosensitive unit.

In an optional implementation, the light filter is located on a surface that is of the photosensitive unit and that is opposite to the optical lens component. In other words, the light filter is fixed to the photosensitive unit.

With reference to the second aspect, the camera module may further include M second lenses, and one second lens corresponds to one first lens. The second lens is configured to receive converged light from the corresponding first lens, further converge the converged light, and transmit further converged light to a corresponding light filter.

Further, optionally, the camera module further includes M collimation lenses, and one collimation lens corresponds to one first lens. In an optional implementation, the collimation lens is located between the first lens and a photosensitive unit, and the collimation lens is configured to collimate converged light from the first lens, and transmit collimated light to a corresponding photosensitive unit. In another possible implementation, the collimation lens is located between the first lens and the optical lens component, and the collimation lens is configured to collimate the light beam from the optical lens component, and transmit collimated light to the corresponding first lens. With the collimation lens, an output light signal can be close to parallel light.

With reference to the second aspect, the M light filters may be repeatedly arranged in any one of the following manners.

Manner 1: Four light filters are RGGB, and RGGB form a 2*2 array.
Manner 2: Four light filters are RYYB, and RYYB form a 2*2 array.
Manner 3: Four light filters are RGBW, and RGBW form a 2*2 array.
Manner 4: Four light filters are RYBW, and RYBW form a 2*2 array.

Based on the foregoing manner 3 and manner 4, with a W light filter, in a scenario with relatively low ambient luminance, an amount of light entering the image sensor in the camera module can be increased for synthesis into a low-light image of higher quality.

Manner 5: Six light filters are RGBWW-(NIR), and RGBWW-(NIR) form a 3*2 array or a 2*3 array.
Manner 6: Six light filters are RYBWW-(NIR), and RYBWW-(NIR) form a 3*2 array or a 2*3 array.

Based on the foregoing manner 5 and manner 6, a W light filter is disposed, so that in a scenario with relatively low ambient luminance, an amount of light entering the image sensor in the camera module can be increased. A W− light filter is disposed, so that based on a light attenuation characteristic of the W− light filter, an amount of light entering the image sensor in the camera module can be reduced in an extremely bright environment. A combination of the W light filter and the W− light filter can achieve dynamic range representation of a higher range in an environment with a high light ratio. A NIR light filter is disposed, so that a unique image in a NIR band can be obtained.

Manner 7: Three light filters are RGB, and RGB form a 1*3 array or a 3*1 array.
Manner 8: Three light filters are RYB, and RYB form a 1*3 array or a 3*1 array.
Manner 9: Based on any one of the foregoing manner 1 to manner 8, some of the M light filters are particular light filters that allow particular light signals to be filtered, and the particular light filters are arranged in a light filtering layer according to a preset rule.

Based on the foregoing manner 9, further, optionally, the preset rule includes arrangement at equal intervals; or the preset rule includes that the light filtering layer is divided into at least two regions, arrangement is performed at equal intervals in each region, and intervals corresponding to the at least two regions are different or the same.

According to a third aspect, this application provides a camera. The camera includes any camera module described above and a fixing structure, and the fixing structure is configured to fix the camera module.

According to a fourth aspect, this application provides a terminal device. The terminal device includes any camera module described above and a processor, and the processor is configured to process image information in the camera module.

According to a fifth aspect, this application provides a method for determining image information. The method may be applied to a camera module. The camera module includes a light filtering layer. The method includes: receiving a light beam from a photographed object, and transmitting the light beam to the light filtering layer; moving a position of the light filtering layer; and obtaining light signals filtered at different positions from the light filtering layer, and determining image information based on the light signals at the different positions.

Based on this solution, the position of the light filtering layer is moved, so that light signals filtered by the light filtering layer at different spatial positions are obtained, to complete sampling at different physical spatial positions, thereby increasing a sampling frequency at a spatial position, and helping improve a resolution of an image of the photographed object.

The following two implementations of moving the light filtering layer are given.

Implementation 1: Positions of light filtering units are moved, so that each light filtering unit corresponds to different photosensitive units.

In an optional implementation, the light filtering layer includes M light filtering units, the camera module further includes N photosensitive units, one light filtering unit allows light signals within at least one wavelength range to be filtered, one photosensitive unit corresponds to at least three different light filtering units, and both N and M are integers greater than 2. Positions of the light filtering units may be moved, so that each light filtering unit corresponds to different photosensitive units. Light signals respectively filtered by at least three corresponding different light filtering units are obtained, to obtain P light signals, and image information is determined based on the P light signals. P is an integer greater than 2, and wavelength ranges of at least three of the P light signals are different.

Based on the implementation 1, the positions of the light filtering units are moved, so that each light filtering unit corresponds to different photosensitive units, and one photosensitive unit may obtain P real light signals transmitted by at least three corresponding light filtering units. Wavelength ranges of at least three of the P light signals are different. Image information is determined based on the P light signals without a color guessing process, thereby helping improve accuracy of light beam collection performed by the photosensitive unit on the photographed object, and helping avoid a false color caused by color guessing. Further, if the at least three different light signals include a red light signal, a green light signal, and a blue light signal, a full color from the photographed object can be obtained.

In an optional implementation, the light filtering unit may include a light filter. If an arrangement manner of light filters in the at least three different light filtering units is RGGB, RYYB, RGBW, RYBW, RGBWW-(NIR), or RYBWW-(NIR), switching is performed between the different photosensitive units in a plane parallel to the N photosensitive units and respectively along a row direction and a column direction of the array. If the arrangement manner of the light filters in the at least three different light filtering units is RGB or RYB, switching is performed between the different photosensitive units in a plane parallel to the N photosensitive units and along a column direction or a row direction of the array. RGGB, RYYB, RGBW, and RYBW are all 2*2 arrays, RGBWW-(NIR) and RYBWW-(NIR) are both 3*2 arrays or 2*3 arrays, and RGB and RYB are both 1*3 arrays or 3*1 arrays.

Implementation 2: Light filtering units are moved between K regions.

In an optional implementation, the light filtering layer includes M light filtering units, and M is an integer greater than 2. The light filtering units may be moved between the K regions, to obtain light signals at K different spatial positions in the K regions, where K is an integer greater than 1. Image information is determined based on the light signals at the K different spatial positions.

Based on the implementation 2, the light filtering units move between the K regions, so that light signals at K different spatial positions may be obtained, thereby increasing a frequency in light signal sampling at a spatial position, and helping improve a resolution of a formed image of the photographed object.

In an optional implementation, the camera module may further include N photosensitive units. The light filtering units may move between the K regions along a plane parallel to the N photosensitive units, where a movement distance between two adjacent regions is less than a distance between geometric centers of two adjacent photosensitive units, and N is an integer greater than 2.

According to a sixth aspect, this application provides a method for determining image information. The method may be applied to a camera module, the camera module includes M first lenses, and M is an integer greater than 2. The method includes: receiving a light beam from a photographed object, and transmitting the light beam to the M first lenses; converging the light beam, and moving the M first lenses between K regions; obtaining light signals at K different spatial positions in the K regions; and determining image information based on the light signals at the K different spatial positions, where K is an integer greater than 1.

Based on this solution, the first lenses move between the K regions, so that light signals at K different spatial positions may be obtained, thereby increasing a frequency in light signal sampling at a spatial position, and helping improve a resolution of a formed image of the photographed object.

In an optional implementation, the camera module may further include N photosensitive units, and N is an integer greater than 2. Movement may be performed between the K regions along a plane parallel to the N photosensitive units, where a movement distance between two adjacent regions is less than a distance between geometric centers of two adjacent photosensitive units.

According to a seventh aspect, this application provides a computer-readable storage medium. The computer-readable storage medium stores a computer program or instructions. When the computer program or the instructions are executed by a terminal device, the terminal device is enabled to perform the method in any one of the fifth aspect or the possible implementations of the fifth aspect, or the terminal device is enabled to perform the method in any one of the sixth aspect or the possible implementations of the sixth aspect.

According to an eighth aspect, this application provides a computer program product. The computer program product includes a computer program or instructions. When the computer program or the instructions are executed by a terminal device, the terminal device is enabled to perform the method in any one of the fifth aspect or the possible implementations of the fifth aspect, or the terminal device is enabled to perform the method in any one of the sixth aspect or the possible implementations of the sixth aspect.

According to a ninth aspect, this application provides a computer-readable storage medium. The computer-readable storage medium stores a computer program or instructions. When the computer program or the instructions are executed by a camera, the camera is enabled to perform the method in any one of the fifth aspect or the possible implementations of the fifth aspect, or the camera is enabled to perform the method in any one of the sixth aspect or the possible implementations of the sixth aspect.

According to a tenth aspect, this application provides a computer program product. The computer program product includes a computer program or instructions. When the computer program or the instructions are executed by a camera, the camera is enabled to perform the method in any one of the fifth aspect or the possible implementations of the fifth aspect, or the camera is enabled to perform the method in any one of the sixth aspect or the possible implementations of the sixth aspect.

BRIEF DESCRIPTION OF DRAWINGS

FIG. 4d is a schematic diagram of yet another arrangement manner of light filters in four light filtering units corresponding to one photosensitive unit according to this application;

FIG. 4e is a schematic diagram of an arrangement manner of light filters in six light filtering units corresponding to one photosensitive unit according to this application;

FIG. 4f is a schematic diagram of another arrangement manner of light filters in six light filtering units corresponding to one photosensitive unit according to this application;

FIG. 5b is a schematic diagram of a structure of another light filtering layer according to this application;

FIG. 5c is a schematic diagram of a structure of still another light filtering layer according to this application;

FIG. 5d is a schematic diagram of a structure of yet another light filtering layer according to this application;

FIG. 5e is a schematic diagram of a structure of still yet another light filtering layer according to this application;

FIG. 5f is a schematic diagram of a structure of a further light filtering layer according to this application;

FIG. 5g is a schematic diagram of a structure of a still further light filtering layer according to this application;

FIG. 5h is a schematic diagram of a structure of a yet further light filtering layer according to this application;

FIG. 5i is a schematic diagram of a structure of a light filtering layer according to this application;

DESCRIPTION OF EMBODIMENTS

To make the objectives, technical solutions, and advantages of this application clearer, the following further describes this application in detail with reference to the accompanying drawings.

The following describes some terms in this application, to facilitate understanding for a person skilled in the art.

(1) Resolution

The resolution refers to a maximum quantity of pixels (photosensitive units) that are on an image sensor in a camera module and that can be used for imaging. Generally, a product of a quantity of horizontal pixels and a quantity of vertical pixels is used for measurement, that is, resolution=quantity of horizontal pixels×quantity of vertical pixels.

(2) Pixel

The pixel refers to a minimum unit that constitutes an imaging region of the image sensor. A pixel size refers to a physical size of the pixel, that is, a distance between centers of adjacent pixels.

Figure 1A:
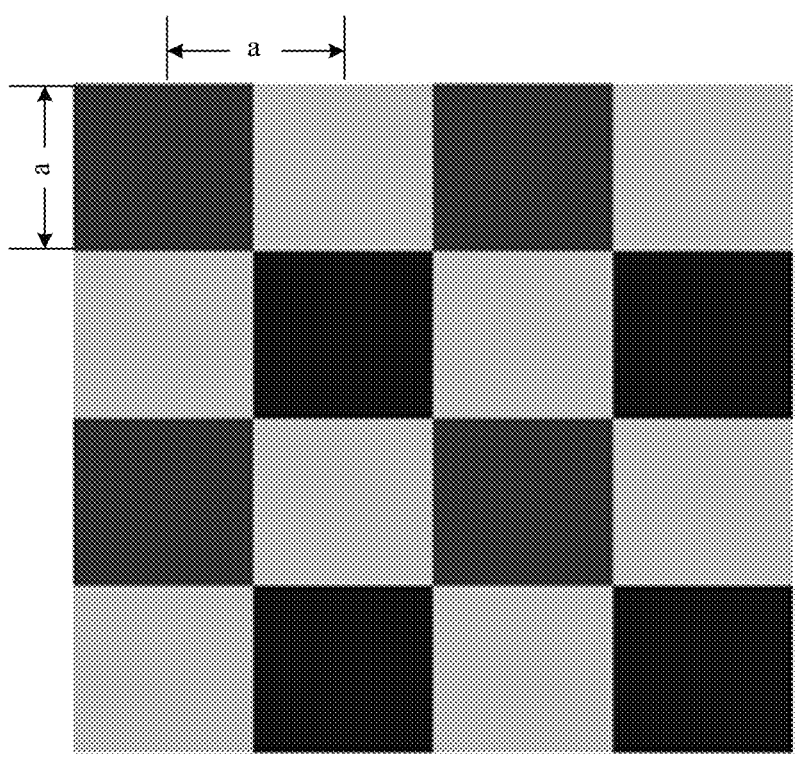
FIG. 1a is a schematic diagram of a relationship between a pixel size and a resolution according to this application.
Figure 1B:
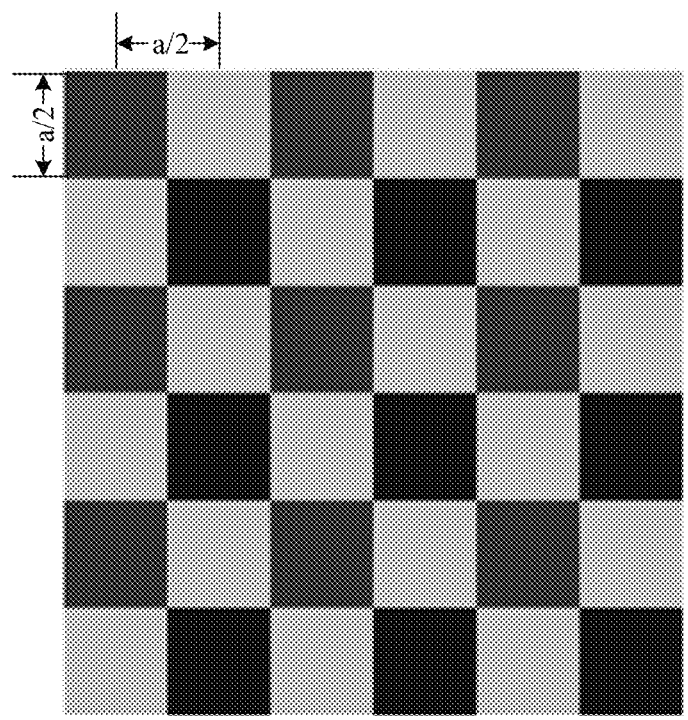
FIG. 1b is another schematic diagram of a relationship between a pixel size and a resolution according to this application.

It should be noted that, for a same photosensitive area, the resolution is inversely proportional to the pixel size. Refer to FIG. 1a and FIG. 1b for a relationship between the pixel size and the resolution for a same photosensitive area. In FIG. 1a, the pixel size is a, and the resolution is 4*4. In FIG. 1b, the pixel size is a/2, and the resolution is 8*8. It can be determined from FIG. 1a and FIG. 1b that a smaller pixel size indicates a higher resolution, and a larger pixel size indicates a lower resolution. When a high-resolution image and a low-resolution image are zoomed to a same size for viewing or printing, the high-resolution image looks clearer and sharper.

(3) Full Color

The full color refers to a color constituted by three basic colors of red, green, and blue.

(4) Working Principle of the Camera Module

After preliminary work such as aperture, shutter, and focusing settings is completed, and the shutter is pressed down, a light beam from a photographed object passes through an optical lens component and is decomposed into monochromatic light signals by light filtering units in a light filtering layer. A light intensity value corresponding to each monochromatic light signal is recorded by a photosensitive unit in the image sensor to obtain unprocessed image data, and image information can be determined based on the unprocessed image data.

As described in the background, in a current camera module, a photosensitive unit of an image sensor can receive only a light signal in one fixed color (for example, one of red, yellow, green, and blue), while light in other colors needs to be determined by using a color guessing algorithm. Therefore, a resolution of an image formed by using a camera module in a conventional technology is relatively low.

To resolve this problem, this application proposes a camera module. In the camera module, a light filtering layer (that is, each light filtering unit in the light filtering layer) is driven by a drive module to switch between different photosensitive units, so that each photosensitive unit can receive light signals transmitted from different light filtering units, and the photosensitive unit does not need to determine different light signals by using the color guessing algorithm, thereby helping improve a resolution of an image formed by using the camera module.

The camera module proposed in this application is specifically described below with reference to FIG. 2a to FIG. 12c.

Figure 2A:
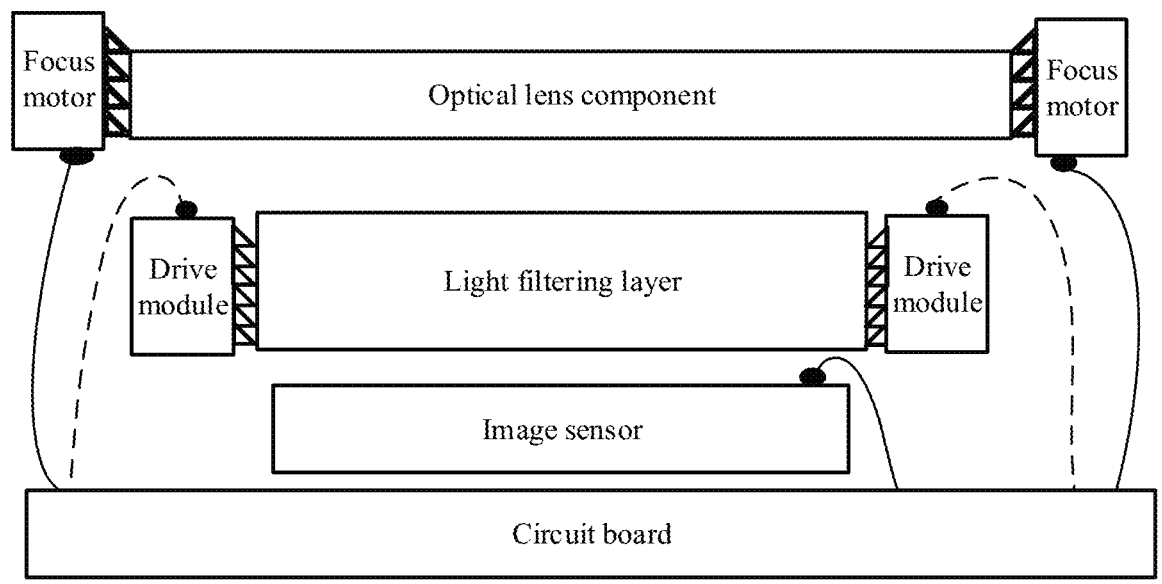
FIG. 2a is a schematic diagram of a structure of a camera module according to this application.

FIG. 2a is a schematic diagram of a structure of a camera module according to this application. The camera module may include an optical lens component, a light filtering layer, an image sensor, and a drive module. The optical lens component is configured to receive a light beam from a photographed object, and transmit the light beam to the light filtering layer. The light filtering layer is configured to move a position under the drive of the drive module, and respectively transmit light signals filtered at different positions to the image sensor. The image sensor is configured to receive the light signals at the different positions that are transmitted from the light filtering layer, and determine image information based on the light signals at the different positions.

Based on the camera module, the drive module drives the light filtering layer to move the position, so that light signals filtered at different spatial positions may be respectively transmitted to the image sensor, and the image sensor may complete sampling at different physical spatial positions, thereby increasing a frequency of the image sensor in sampling at a spatial position, and helping improve a resolution of an image of the photographed object.

The following further describes the camera module shown in FIG. 2a, to provide an example of a specific implementation solution.

Figure 2B:
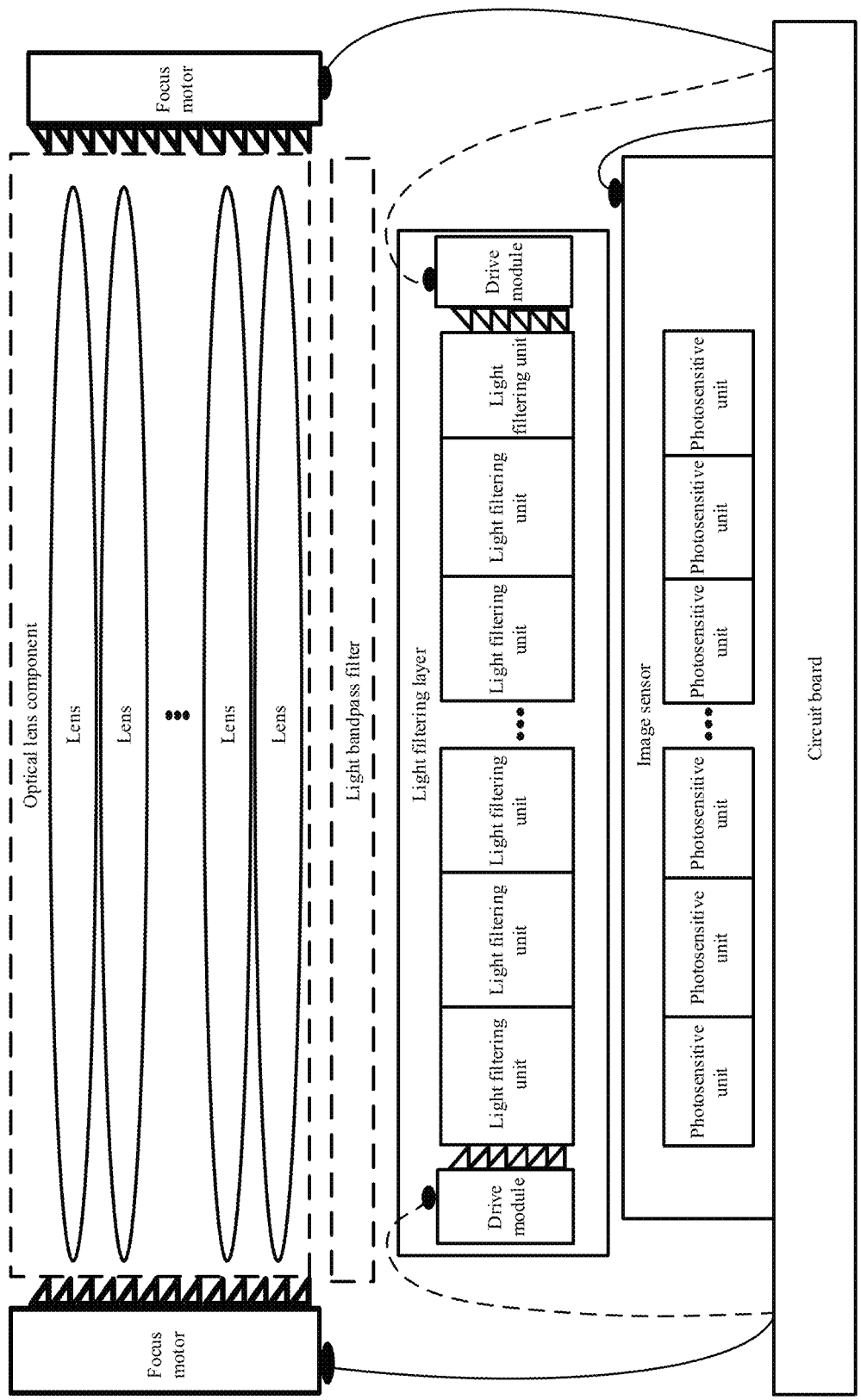
FIG. 2b is a schematic diagram of a structure of another camera module according to this application.

FIG. 2b is a schematic diagram of a structure of another camera module according to this application. The camera module may include an optical lens component, a light filtering layer, an image sensor, and a drive module. The light filtering layer includes M light filtering units, one light filtering unit allows light signals within at least one wavelength range to be filtered (which may also be referred to as pass), the image sensor includes N photosensitive units, and both M and N are integers greater than 2.

Based on the camera module shown in FIG. 2b, in an optional implementation, one photosensitive unit corresponds to at least three different light filtering units. The optical lens component is configured to receive a light beam from a photographed object, and transmit the light beam to the light filtering layer. The light filtering unit is configured to move a position under the drive of the drive module to correspond to different photosensitive units, and respectively transmit filtered light signals to the different photosensitive units. The photosensitive unit is configured to: receive light signals respectively transmitted from the at least three corresponding different light filtering units, to obtain P light signals, and determine image information based on the P light signals, where P is an integer greater than 2, and wavelength ranges of at least three of the P light signals are different.

In this application, the light filtering unit may be a minimum unit in the light filtering layer, and may selectively allow a wavelength range of an input light beam to pass. For example, in the input light beam, a light signal within a red light wavelength range is allowed to pass, and/or a light signal within a green light wavelength range is allowed to pass, and/or a light signal within a blue light wavelength range is allowed to pass.

For example, at least three different light filtering units corresponding to a photosensitive unit A include a light filtering unit a, a light filtering unit b, and a light filtering unit c. The light filtering unit a allows a light signal a to be filtered, the light filtering unit b allows a light signal b to be filtered, the light filtering unit c allows a light signal c to be filtered, and a wavelength range of the light signal a, a wavelength range of the light signal b, and a wavelength range of the light signal c are different from each other. The light filtering unit a, the light filtering unit b, and the light filtering unit c all move under the drive of the drive module to correspond to the photosensitive unit A. Therefore, the photosensitive unit A may obtain the light signal a filtered by the light filtering unit a, the light signal b filtered by the light filtering unit b, and the light signal c filtered by the light filtering unit c. That is, the photosensitive unit A may obtain three light signals, and wavelength ranges corresponding to the three light signals are different from each other. If the wavelength ranges corresponding to the three light signals are respectively a red light wavelength range, a green light wavelength range, and a blue light wavelength range, the photosensitive unit A may collect a full color of the light beam from the photographed object.

The drive module drives the light filtering unit to move the position to correspond to different photosensitive units, so that one photosensitive unit may receive P real light signals transmitted from at least three corresponding light filtering units. Wavelength ranges of at least three of the P light signals are different. In other words, the photosensitive unit may obtain at least three real light signals within different wavelength ranges. Image information is determined based on the P light signals without a color guessing process, thereby helping improve accuracy of light beam collection performed by the photosensitive unit on the photographed object, and helping avoid a false color caused by color guessing. Further, if the at least three different light signals include a red light signal, a green light signal, and a blue light signal, the photosensitive unit may collect a full color from the photographed object.

Based on the camera module shown in FIG. 2b, in another possible implementation, one photosensitive unit corresponds to one light filtering unit. The light filtering unit is configured to move between K regions under the drive of the drive module, and transmit light signals at K different spatial positions that are obtained in the K regions to the corresponding photosensitive unit, where K is an integer greater than 1. The photosensitive unit is configured to receive the light signals at the K different spatial positions from the corresponding light filtering unit, and determine image information based on the light signals at the K different spatial positions.

The drive module drives the light filtering unit to move between the K regions, so that one photosensitive unit may receive light signals at K different spatial positions from a corresponding light filtering unit, thereby increasing a frequency of the photosensitive unit in light signal sampling at a spatial position, and helping improve a resolution of a formed image. In other words, the camera module may complete sampling at different physical spatial positions by using a same photosensitive unit, thereby increasing a sampling frequency at a spatial position, and helping improve a resolution of an image of the photographed object.

It should be noted that, the K regions are K different spatial regions, and intensity of light signals corresponding to the K different spatial regions may be different. In addition, a light signal filtered by a light filtering unit is always input into a photosensitive unit corresponding to the light filtering unit.

The following describes each functional module and structure shown in FIG. 2a and FIG. 2b, to provide an example of a specific implementation.

1. Optical Lens Component

In this application, the optical lens component may include at least one optical lens, and may be configured to receive the light beam from the photographed object, and change a transmission direction of the light beam from the photographed object, so that the light beam is input into the light filtering layer as much as possible. Further, a focal length may be changed under the drive of a focus motor, so that the image sensor forms a clear image.

2. Light Filtering Unit

Figure 3A:
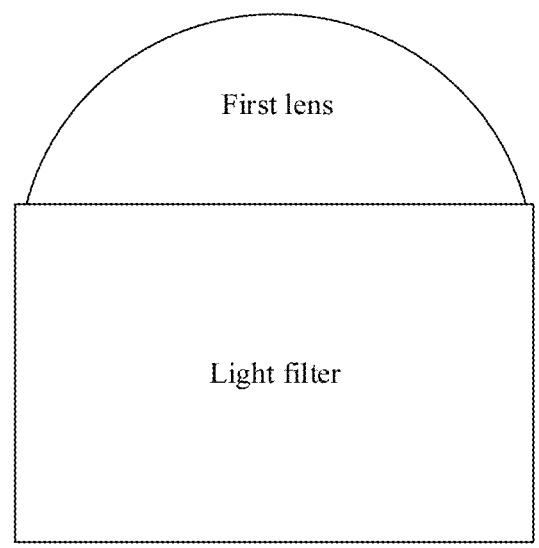
FIG. 3a is a schematic diagram of a structure of a processing unit according to this application.

FIG. 3a is a schematic diagram of a structure of a light filtering layer according to this application. The light filtering unit includes a light filter and a first lens, and the first lens may be located on a surface that is of the light filter and that is opposite to the optical lens component. The first lens is configured to converge the light beam from the optical lens component, and transmit a converged light beam to the light filter. The light filter is configured to filter the converged light beam, and respectively transmit filtered light signals to different photosensitive units. In other words, the first lens is disposed above the light filter, and the first lens may collect and shape the light beam from the photographed object.

Figure 3B:
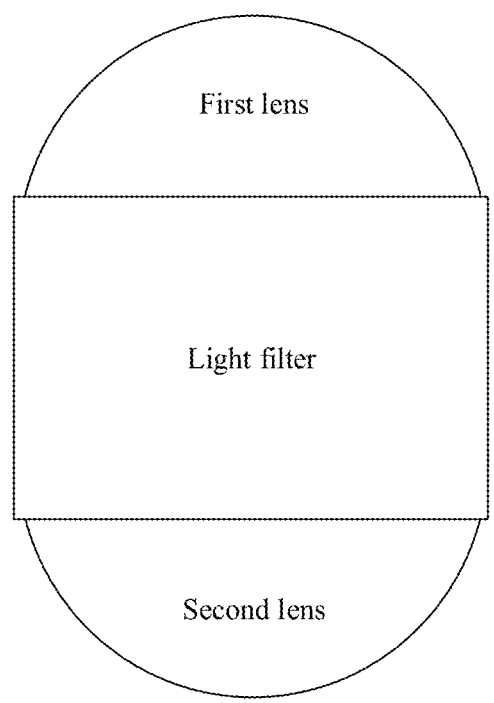
FIG. 3b is a schematic diagram of a structure of another light filtering unit according to this application.

Further, optionally, the light filtering unit may further include a second lens. FIG. 3b is a schematic diagram of a structure of another light filtering unit according to this application. The light filtering unit may include a first lens, a light filter, and a second lens. The first lens may be located on a surface that is of the light filter and that is opposite to the optical lens component, and the second lens is located on a surface that is of the light filter and that is opposite to the image sensor. In other words, the first lens and the second lens are located on opposite surfaces of the light filter. The first lens is configured to converge the light beam from the optical lens component, and transmit a converged light beam to the light filter. The light filter is configured to filter the converged light beam, and transmit filtered light signals to the second lens. The second lens is configured to receive the light signals from the light filter, converge the light signals, and respectively transmit converged light signals to different photosensitive units. The second lens is disposed so that on one hand, the light signals filtered by the light filter can be further converged, and on the other hand, a distance between the light filter and the photosensitive unit can be increased, thereby helping reduce packaging difficulty of the camera module.

Figure 3C:
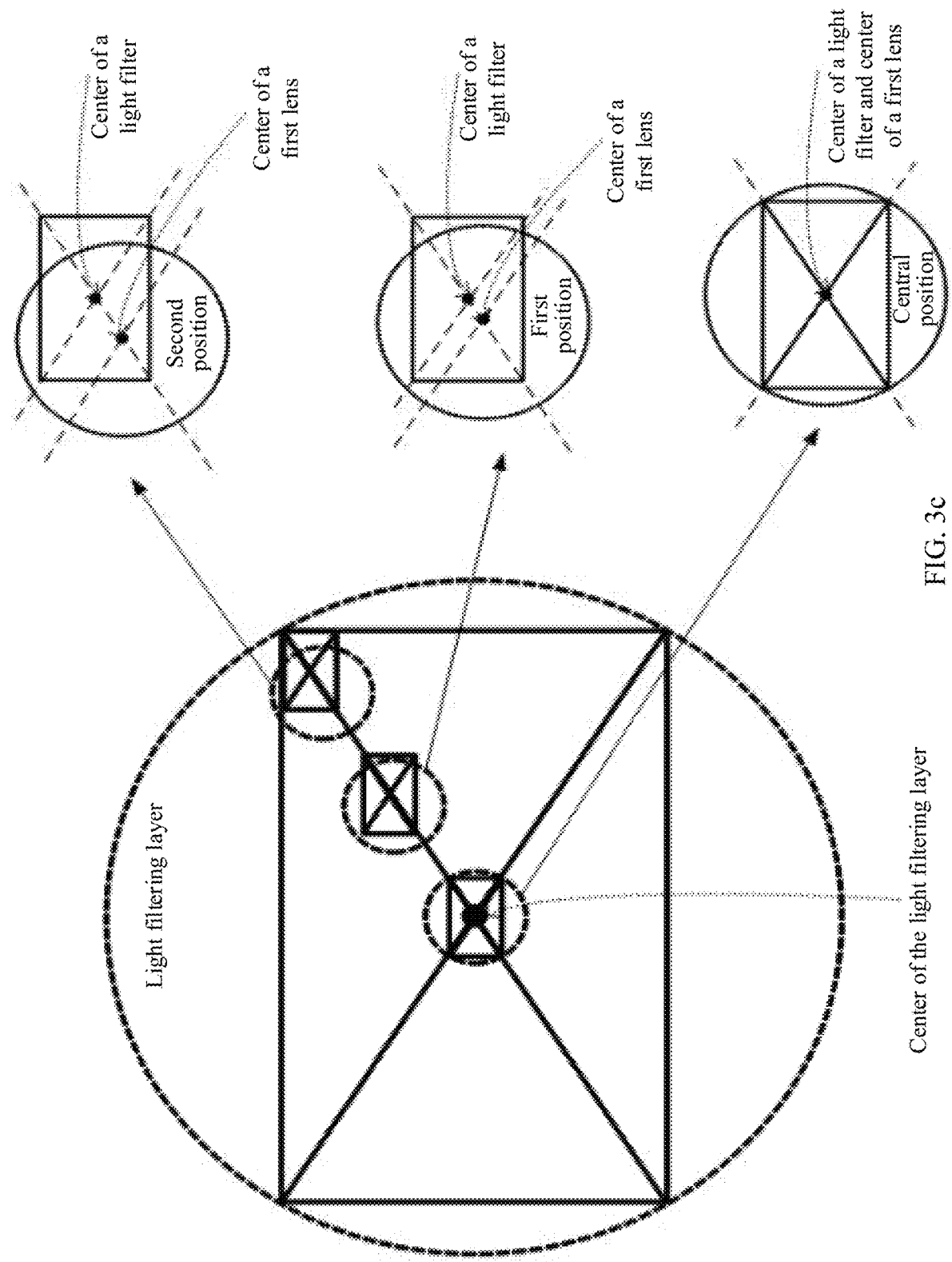
FIG. 3c is a schematic diagram of a position relationship between a center of a light filter and a center of a first lens according to this application.

In this application, light filters and first lenses are not all center-aligned. FIG. 3c is a schematic diagram of a position relationship between a center of a light filter and a center of a first lens according to this application. If the light filtering unit is located at a central position of the light filtering layer, the center of the first lens is aligned with the center of the light filter. If the light filtering unit is located in a region of the light filtering layer other than the central position, a first distance between the center of the light filtering layer and a center of the light filtering layer is greater than a second distance between the center of the first lens and the center of the light filtering layer. In other words, if the light filtering unit is located in a region of the light filtering layer other than the central position, the center of the first lens is closer to the center of the light filtering layer than the center of the light filtering layer. This helps prevent one light filter from transmitting a filtered light signal to two photosensitive units at a time when the light beam from the photographed object is input at a relatively large angle, to avoid a "cross-color" problem.

Optionally, a difference between a first distance corresponding to a light filtering unit at a first position and a corresponding second distance is less than a difference between a first distance corresponding to a light filtering unit at a second position and a corresponding second distance. A distance between the first position and the center of the light filtering layer is less than a distance between the second position and the center of the light filtering layer. The first distance is a distance between a center of the light filtering layer and the center of the light filtering layer. The second distance is a distance between a center of a first lens and the center of the light filtering layer. Alternatively, it may be understood that, when the light filtering unit is farther from the central position of the light filtering layer, a distance between the center of the light filter and the center of the first lens is larger, which may be of a stepped type. In other words, when the distance between the light filtering unit and the center of the light filtering layer is larger, the center of the light filter is farther from the center of the light filtering layer than the center of the first lens.

It should be noted that the light filters may have a geometrically symmetrical shape (for example, a square or regular hexagonal shape), the light filters may be closely arranged into an array, and an effective array region in the array may be rectangular or square as a whole, that is, the light filtering layer may be square or rectangular. It may be understood that when the light filters are square, the light filtering layer formed by closely arranging the light filters may be square or rectangular. When the light filters are in the regular hexagonal shape, the light filtering layer formed by closely arranging the light filters may be approximately rectangular or square as a whole, and has an uneven edge.

When the light filtering layer is rectangular, the center of the light filtering layer may be an intersection between diagonal lines of a rectangular or square effective region. The center of the light filter refers to a geometric center of the light filter, and the center of the first lens refers to a geometric center of the first lens. When the light filter is square, the center of the light filter is an intersection between diagonal lines. When the first lens is spherical or ellipsoidal, the center of the first lens is also an intersection between diagonal lines.

In an optional implementation, a center of the second lens is aligned with the center of the light filter.

In this application, the camera module may further include M collimation lenses, and one collimation lens corresponds to one first lens. In an optional implementation, the collimation lens may be located between the first lens and a photosensitive unit, and the collimation lens is configured to collimate a converged light signal from the first lens, and transmit collimated light to a corresponding photosensitive unit. In another possible implementation, the collimation lens may be located between the first lens and the optical lens component, and the collimation lens is configured to collimate the light beam from the optical lens component, and transmit collimated light to the first lens. With the collimation lens, an output light signal can be closer to parallel light.

In other words, the camera module may include a light filter, a first lens, and a collimation lens. Alternatively, the camera module may include a light filter, a first lens, a second lens, and a collimation lens.

In this application, an arrangement manner of light filters in at least three different light filtering units corresponding to one photosensitive unit may include any one of the following cases.

Case 1: One photosensitive unit corresponds to four light filtering units, and light filters in the four light filtering units are RGGB.

Figure 4A:
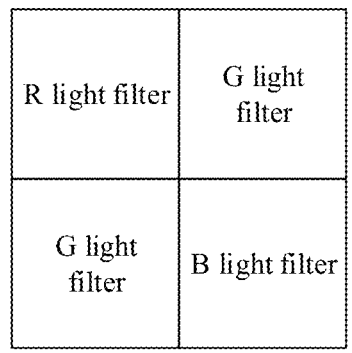
FIG. 4a is a schematic diagram of an arrangement manner of light filters in four light filtering units corresponding to one photosensitive unit according to this application.

FIG. 4a is a schematic diagram of an arrangement manner of light filters in four light filtering units corresponding to one photosensitive unit according to this application. The four light filters RGGB may form a 2*2 array. The R light filter is a light filter that allows a red light signal to be filtered. The G light filter is a light filter that allows a green light signal to be filtered. The B light filter is a light filter that allows a blue light signal to be filtered. In this way, one photosensitive unit may collect a full color, that is, a red light signal, a green light signal, and a blue light signal, from the photographed object without a color guessing process, thereby helping improve accuracy of light beam collection performed by the photosensitive unit on the photographed object.

Figure 4B:
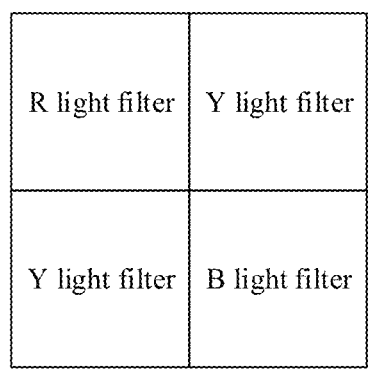
FIG. 4b is a schematic diagram of another arrangement manner of light filters in four light filtering units corresponding to one photosensitive unit according to this application.
Figure 4C:
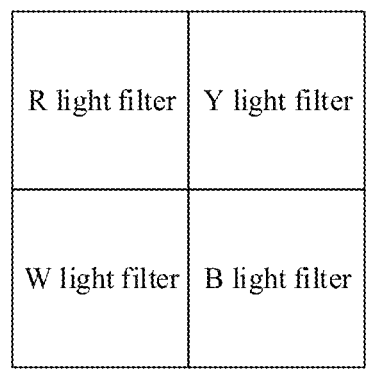
FIG. 4c is a schematic diagram of still another arrangement manner of light filters in four light filtering units corresponding to one photosensitive unit according to this application.
Figures 4G, 5A:
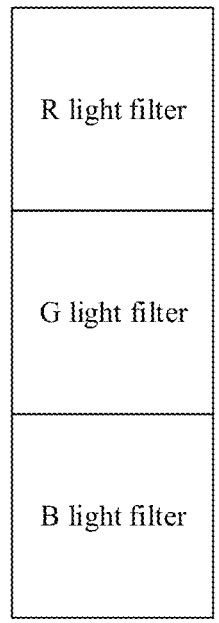
FIG. 4g is a schematic diagram of an arrangement manner of light filters in three light filtering units corresponding to one photosensitive unit according to this application.
FIG. 5a is a schematic diagram of a structure of a light filtering layer according to this application.

Based on the arrangement manner of light filters shown in FIG. 4a, a structure of the light filtering layer may be shown in FIG. 5a, and the light filters in the light filtering layer may be arranged by using RGGB shown in FIG. 4a as a minimum repeatable unit. Two R light filters, two B light filters and four G light filters are distributed around each G light filter. In other words, a quantity of G light filters in the light filtering layer is twice a quantity of light filters for each of other two colors.

Case 2: One photosensitive unit corresponds to four light filtering units, and light filters in the four light filtering units are RYYB.

FIG. 4b is a schematic diagram of another arrangement manner of light filters in four light filtering units corresponding to one photosensitive unit according to this application. The four light filters RYYB may form a 2*2 array. The R light filter is a light filter that allows a red light signal to be filtered. The Y light filter is a light filter that allows a red light signal and a green light signal to be filtered. The B light filter is a light filter that allows a blue light signal to be filtered. In this way, one photosensitive unit may collect a full color, that is, a red light signal, a green light signal, and a blue light signal, from the photographed object without a color guessing process, thereby helping improve accuracy of light beam collection performed by the photosensitive unit on the photographed object.

Based on the arrangement manner of light filters shown in FIG. 4b, a structure of the light filtering layer may be shown in FIG. 5b, and the light filters in the light filtering layer may be arranged by using RYYB shown in FIG. 4b as a minimum repeatable unit.

Case 3: One photosensitive unit corresponds to four light filtering units, and light filters in the four light filtering units are RYBW.

FIG. 4c is a schematic diagram of still another arrangement manner of light filters in four light filtering units corresponding to one photosensitive unit according to this application. The four light filters RYBW may form a 2*2 array. For the R light filter, the Y light filter, and the B light filter, refer to the description of the foregoing case 2. Details are not described herein again.

The W light filter is a white light filter that allows all visible light to pass. With the W light filter, in a scenario with relatively low ambient luminance, an amount of light entering the image sensor in the camera module can be increased for synthesis into a low-light image of higher quality. It should be understood that, the case 3 may be understood as replacing a repeated Y light filter in the case 2 with a W light filter.

Based on the arrangement manner of light filters shown in FIG. 4c, a structure of the light filtering layer may be shown in FIG. 5c, and the light filters in the light filtering layer may be arranged by using RYBW shown in FIG. 4c as a minimum repeatable unit.

Case 4: One photosensitive unit corresponds to four light filtering units, and light filters in the four light filtering units are RGBW.

FIG. 4d is a schematic diagram of yet another arrangement manner of light filters in four light filtering units corresponding to one photosensitive unit according to this application. The four light filters RGBW may form a 2*2 array. For the R light filter, the G filter, and the B light filter, refer to the description of the foregoing case 1. For the W light filter, refer to the description of the foregoing case 3. Details are not described herein again. It should be understood that, the case 4 may be understood as replacing a G filter in the case 1 with a W light filter.

Based on the arrangement manner of light filters shown in FIG. 4d, a structure of the light filtering layer may be shown in FIG. 5d, and the light filters in the light filtering layer may be arranged by using RGBW shown in FIG. 4d as a minimum repeatable unit.

Case 5: One photosensitive unit corresponds to six light filtering units, and light filters in the six light filtering units are RGBWW-(NIR).

The six light filters RGBWW-(NIR) may form a 3*2 array or a 2*3 array. FIG. 4e is a schematic diagram of another arrangement manner of light filters in six light filtering units corresponding to one photosensitive unit according to this application. That the RGBWW-(NIR) light filters form a 3*2 array is used as an example for description. For the R light filter, the G filter, and the B light filter, refer to the description of the foregoing case 1. For the W light filter, refer to the description of the foregoing case 3. Details are not described herein again one by one. The W− light filter is a white light reduced filter (also referred to as a white light reduced lens), which allows 50% (or a lower percentage, such as 25%) of visible light to pass. The near-infrared (NIR) light filter is a light filter that allows a near-infrared light signal to pass.

Based on the arrangement manner of light filters shown in FIG. 4e, a structure of the light filtering layer may be shown in FIG. 5e, and the light filters in the light filtering layer may be arranged by using RGBWW-(NIR) shown in FIG. 4e as a minimum repeatable unit.

Case 6: One photosensitive unit corresponds to six light filtering units, and light filters in the six light filtering units are RYBWW-(NIR).

The six light filters RYBWW-(NIR) may form a 3*2 array or a 2*3 array. FIG. 4f is a schematic diagram of another arrangement manner of light filters in six light filtering units corresponding to one photosensitive unit according to this application. That the four light filters RYBWW-(NIR) form a 3*2 array is used as an example for description. For the R light filter, the Y light filter, and the B light filter, refer to the description of the foregoing case 2. For the W light filter, refer to the description of the foregoing case 3. For the W− light filter and the NIR light filter, refer to the description of the foregoing case 5. Details are not described herein again one by one.

Based on the arrangement manner of light filters shown in FIG. 4f, a structure of the light filtering layer may be shown in FIG. 5f, and the light filters in the light filtering layer may be arranged by using RYBWW-(NIR) shown in FIG. 4f as a minimum repeatable unit.

Based on the foregoing case 5 and case 6, a W light filter is disposed, so that in a scenario with relatively low ambient luminance, an amount of light entering the image sensor in the camera module can be increased. A W− light filter is disposed, so that based on a light attenuation characteristic of the W− light filter, an amount of light entering the image sensor in the camera module can be reduced in an extremely bright environment. A combination of the W light filter and the W− light filter can achieve dynamic range representation of a higher range in an environment with a high light ratio. A NIR light filter is disposed, so that a unique image in a NIR band can be obtained.

Case 7: One photosensitive unit corresponds to three light filtering units, and light filters in the three light filtering units are RGB.

The three light filters RGB may form a 1*3 array or a 3*1 array. FIG. 4g is a schematic diagram of another arrangement manner of light filters in three light filtering units corresponding to one photosensitive unit according to this application. That the RGB light filters form a 1*3 array is used as an example. For the R light filter, the G light filter, and the B light filter, refer to the description of the foregoing case 1. Details are not described herein again.

Based on the arrangement manner of light filters shown in FIG. 4g, a structure of the light filtering layer may be shown in FIG. 5g, and the light filters in the light filtering layer may be arranged by using RGB shown in FIG. 4g as a minimum repeatable unit.

In an optional implementation, a structure of the light filtering layer may alternatively be a combination of a 1*3 array formed by three RGB light filters and a 3*1 array formed by three RGB light filters, referring to a light filtering layer shown in FIG. 5h.

Case 8: One photosensitive unit corresponds to three light filtering units, and light filters in the three light filtering units are RYB.

The case 8 may be understood as replacing the G light filter in the foregoing case 7 with a Y light filter. For a specific structure, refer to the description of the foregoing case 7. Details are not described herein again.

Based on the foregoing case 7 and case 8, the drive module may drive the light filtering layer to move the position in a direction perpendicular to a stripe formed by same light filters, so that one photosensitive unit may collect a full color, that is, a red light signal, a green light signal, and a blue light signal, from the photographed object without a color guessing process, thereby improving accuracy of light beam collection performed by the photosensitive unit on the photographed object, and helping reduce a time for image photographing by the camera module.

Case 9: Based on any one of the foregoing case 1 to case 8, the light filtering layer may further include particular light filters disposed according to a preset rule.

In the case 9, the particular light filters allow particular light signals to pass. In other words, the particular light filters may allow light signals within a particular wavelength range to be filtered. Further, optionally, there may be one or more types of particular light signals. That is, the particular light signals that the particular light filters allow to pass may be light signals within one wavelength range, or may be light signals within a plurality of wavelength ranges. There may be a specific rule between the plurality of wavelength ranges (for example, intervals between two adjacent wavelength ranges are equal). This is not limited in this application.

The particular light filters are disposed in the light filtering layer, so that particular light signals can be detected. Alternatively, it may be understood that, when light signals within one or more particular wavelength ranges need to be detected, light filters that allow the light signals within the particular wavelength ranges to pass may be disposed in the light filtering layer. For example, when a light signal of about 810 nm needs to be detected, a light filter that allows the light signal of about 810 nm to pass may be disposed in the light filtering layer. The light signal of about 810 nm is a particular light signal, and the light filter that allows the light signal of about 810 nm to pass is a particular light filter.

In an optional implementation, the preset rule may be arrangement at equal intervals. For example, the particular light filters are uniformly distributed in the light filtering layer. For another example, the particular light filters are uniformly distributed in a region (for example, a central region, an edge region, or an intermediate transition region) of the light filtering layer. Alternatively, the preset rule may be that the light filtering layer is divided into at least two regions, arrangement is performed at equal intervals in each region, and intervals corresponding to the at least two regions are different. For example, the light filtering layer may be divided into a central region, an edge region, and an intermediate transition region, the particular light filters are arranged at equal intervals in the central region, the edge region, and the intermediate transition region, but an interval corresponding to the central region, an interval corresponding to the edge region, and an interval corresponding to the intermediate transition region are unequal to each other. Alternatively, the preset rule may be that the light filtering layer is divided into at least two regions, arrangement is performed at equal intervals in each region, and intervals corresponding to the at least two regions are the same. Further, optionally, the central region, the edge region, and the intermediate transition region may be rectangular, or may be circular. This is not limited in this application.

FIG. 5i is a schematic diagram of a structure of another light filtering layer according to this application. The light filtering layer is arranged by using RYYB shown in FIG. 4b as a minimum repeatable unit, and particular light filters are disposed at equal intervals (one is disposed every three light filters along a row direction of the array, and one is disposed every two light filters along a column direction of the array). Alternatively, it may be understood that, the light filtering layer is arranged by using RYYB as a minimum repeatable unit, and a light filter at a preset position in RYYB is replaced with a particular light filter.

It should be noted that the arrangement manners of light filters in at least three different light filtering units corresponding to one photosensitive unit in the foregoing case 1 to case 9 are merely examples. In this application, light filters in at least three different light filtering units corresponding to one photosensitive unit may alternatively be arranged in any other possible arrangement manner. For example, RGGB, RYYB, RGBW, and RYBW may all be a 1*4 array or a 4*1 array. RGBWW-(NIR) and RYBWW-(NIR) may both be a 1*6 array or a 6*1 array. RGB and RYB may be arranged with two in one row and one in another row. The arrangement manner of light filters in at least three different light filtering units is not limited in this application.

3. Drive Module

In an optional implementation, the drive module may be configured to drive the light filtering unit to move a position, to correspond to different photosensitive units. Alternatively, it may be understood that the drive module may be configured to drive the light filtering unit to switch from one photosensitive unit to another photosensitive unit. In other words, the light filtering unit moves the position based on a photosensitive unit level.

Figure 6:
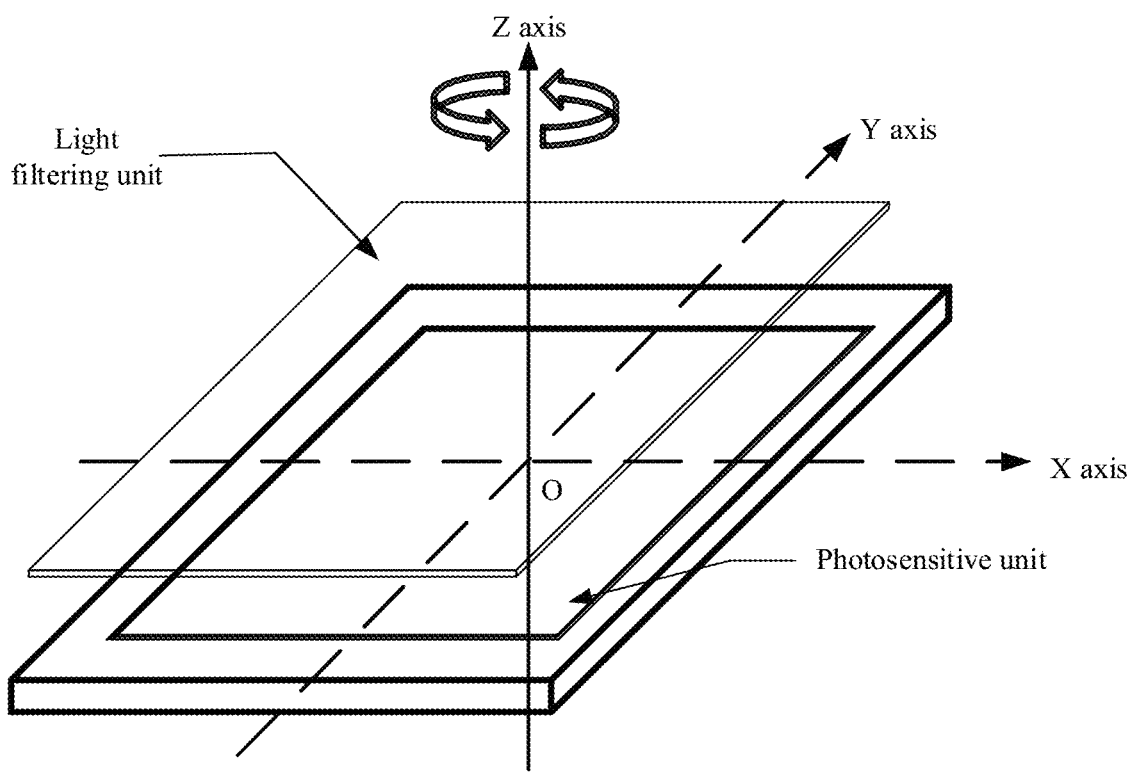
FIG. 6 is a schematic diagram of a relationship between a light filtering unit and a photosensitive unit according to this application.

In an optional implementation, a shape of the light filter may be consistent with a shape of the photosensitive unit. Generally, a size of the light filter is greater than a size of the photosensitive unit, and a ratio of the size of the light filter to the size of the photosensitive unit ranges between 1 and 1.5 times. FIG. 6 is a schematic diagram of a relationship between a light filtering unit and a photosensitive unit according to this application.

Further, optionally, a size of a total effective region of the light filtering layer is also greater than a size of a corresponding effective region of the image sensor below the light filtering layer, whose ratio is consistent with or slightly greater than the ratio of the size of the light filter to the size of the photosensitive unit. This can help overcome impact of a process deviation during packaging of the light filtering layer and the image sensor. It should be noted that, to facilitate packaging of the camera module, generally, the quantity M of light filtering units is greater than the quantity N of photosensitive units, and both M and N are positive integers greater than 2.

With reference to the arrangement manners of light filters in at least three different light filtering units corresponding to one photosensitive unit, a process in which the drive module drives the light filtering unit to move is described below in detail.

In an optional implementation, if an arrangement manner of light filters in at least three light filtering units corresponding to one photosensitive unit is RGGB, RYYB, RGBW, RYBW, RGBWW-(NIR), or RYBWW-(NIR), the drive module may be configured to drive the light filtering unit to switch between different photosensitive units in a plane parallel to the image sensor and respectively along a row direction and a column direction of the array. RGGB, RYYB, RGBW, and RYBW are all 2*2 arrays, and RGBWW-(NIR) and RYBWW-(NIR) are both 3*2 arrays or 2*3 arrays. If the arrangement manner of light filters in at least three light filtering units is RGB or RYB, the drive module is configured to drive the light filtering unit to switch between different photosensitive units in a plane parallel to the image sensor and along a column direction or a row direction of the array. RGB and RYB are both 1*3 arrays or 3*1 arrays.

With reference to FIG. 6, the plane parallel to the image sensor is a plane in which XOY are located, a row direction is a direction in which an X axis is located, and a column direction is a direction in which a Y axis is located.

For ease of description, the R light filtering unit is referred to as R for short, the G light filtering unit is referred to as G for short, the B light filtering unit is referred to as B for short, the Y light filtering unit is referred to as Y for short, the W light filtering unit is referred to as W for short, the W− light filtering unit is referred to as W− for short, and the NIR light filtering unit is referred to as NIR for short. That is, in subsequent descriptions of this application, each R may be replaced with the R light filtering unit, each G may be replaced with the G light filtering unit, each B may be replaced with the B light filtering unit, each Y may be replaced with the Y light filtering unit, each W may be replaced with the W filtering unit, each NIR may be replaced with the NIR light filtering unit, and each W− may be replaced with the W− light filtering unit.

Figure 7:
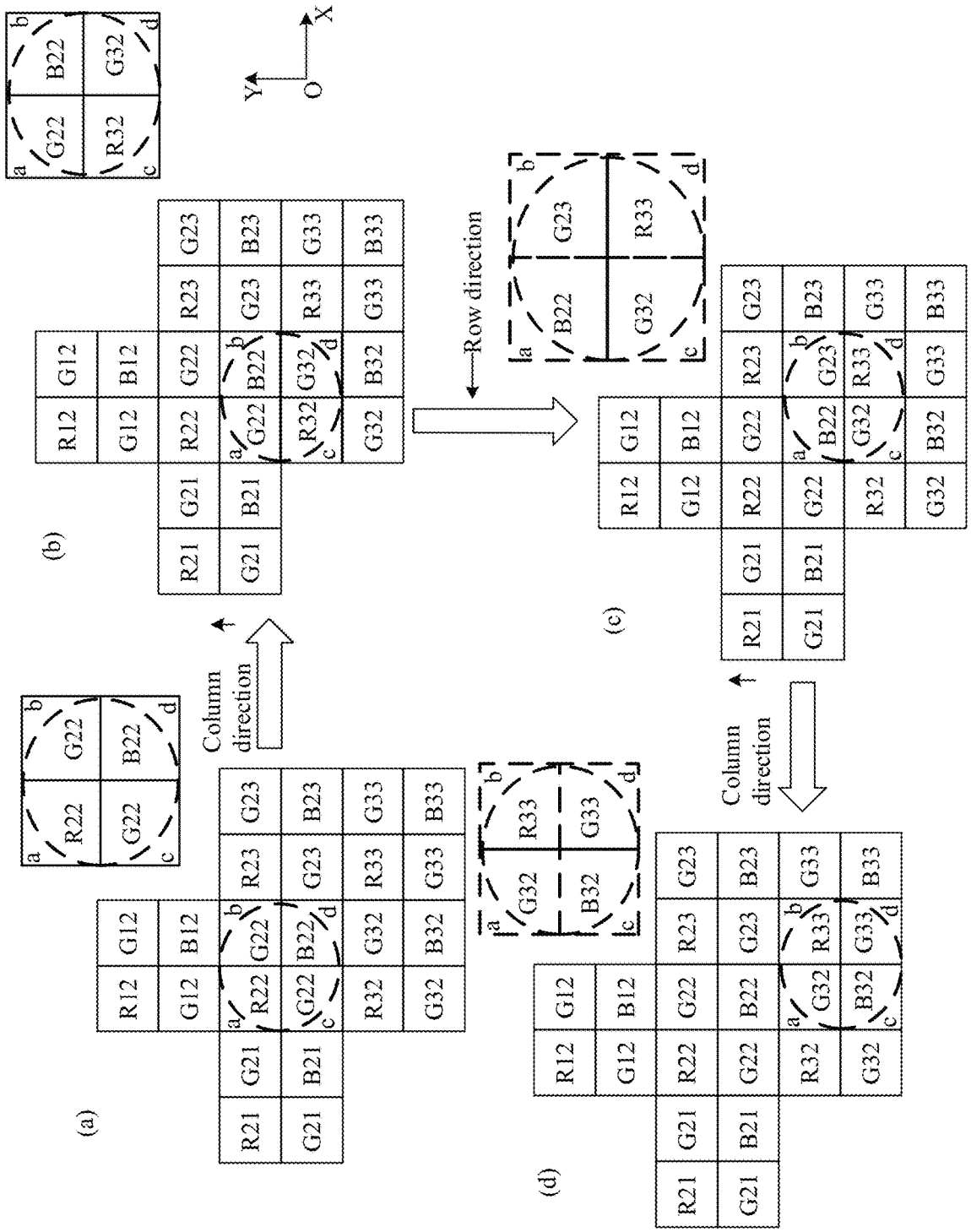
FIG. 7 is a schematic diagram of a process of moving a position of a light filtering unit to correspond to different photosensitive units according to this application.

With reference to the foregoing case 1 and FIG. 6, one photosensitive unit corresponds to four light filtering units, that is, one photosensitive unit corresponds to four light filters RGGB. FIG. 7 shows an example of a schematic diagram of a process of moving a position of a light filtering unit to correspond to different photosensitive units according to this application. For example, FIG. 7(a) shows an initial state for reference, in which one photosensitive unit corresponds to one light filtering unit below, and light filtering units R22, G22, G22, and B22 marked by a circle correspond to four photosensitive units (a photosensitive unit a, a photosensitive unit b, a photosensitive unit c, and a photosensitive unit d) below. The drive module drives the light filtering layer to move by a distance of a side length of one photosensitive unit along a column direction (a positive direction of a Y axis) to obtain a correspondence shown in FIG. 7(b). In the correspondence shown in FIG. 7(b), the photosensitive unit a corresponds to G22, the photosensitive unit b corresponds to B22, the photosensitive unit c corresponds to R32, and the photosensitive unit d corresponds to G32. The drive module then drives the light filtering layer to move by a distance of a side length of one photosensitive unit along a row direction (a negative direction of an X axis) to obtain a correspondence shown in FIG. 7(c). In the correspondence shown in FIG. 7(c), the photosensitive unit a corresponds to B22, the photosensitive unit b corresponds to G23, the photosensitive unit c corresponds to G32, and the photosensitive unit d corresponds to R33. The drive module then drives the light filtering layer to move by a distance of a side length of one photosensitive unit along the column direction (the positive direction of the Y axis) to obtain a correspondence shown in FIG. 7(d). In the correspondence shown in FIG. 7(d), the photosensitive unit a corresponds to G32, the photosensitive unit b corresponds to R33, the photosensitive unit c corresponds to B32, and the photosensitive unit d corresponds to G33. In a process in which the drive module drives the light filtering layer to switch from a position in FIG. 7(a) to a position in FIG. 7(b), then switch to a position in FIG. 7(c), and then switch to a position in FIG. 7(d), the photosensitive unit a respectively corresponds to R22, G22, B22, and G32, that is, the photosensitive unit a may receive a red light signal from R22, a green light signal from G22, a blue light signal from B22, and a green light signal from G32. The photosensitive unit b respectively corresponds to G22, B22, G23, and R33, that is, the photosensitive unit b may receive a green light signal from G22, a blue light signal from B22, a green light signal from G32, and a red light signal from R33. The photosensitive unit c respectively corresponds to G22, R32, G32, and B32, that is, the photosensitive unit c may respectively receive a green light signal from G22, a red light signal from R32, a green light signal from G32, and a blue light signal from B32. The photosensitive unit d respectively corresponds to B22, G32, R33, and G33, that is, the photosensitive unit d may respectively receive a blue light signal from B22, a green light signal from G32, a red light signal from R33, and a green light signal from G33. Each photosensitive unit in the circle may receive one red light signal, one blue light signal, and two green light signals.

It should be noted that in FIG. 7, the directions in which the drive module drives the light filtering layer to move are merely examples, and movement may be performed in other directions to enable the light filtering unit to correspond to different photosensitive units. For example, the photosensitive unit a in FIG. 7(a) is used as an example. In the initial state, the photosensitive unit a corresponds to R22. The drive module may drive the light filtering layer to move by a distance of a side length of one photosensitive unit along the row direction (the negative direction of the X axis). In this case, the photosensitive unit a corresponds to G22. The drive module then drives the light filtering layer to move by a distance of a side length of one photosensitive unit along the column direction (the positive direction of the Y axis). In this case, the photosensitive unit a corresponds to B22. The drive module then drives the light filtering layer to move by a distance of a side length of one photosensitive unit along a row direction (a positive direction of the X axis). In this case, the photosensitive unit a corresponds to G22. That is, the photosensitive unit a respectively corresponds to R22, G22, B22 and G22, and the photosensitive unit a may respectively receive a red light signal from R22, green light signals from two G22, and a blue light signal from B22. In addition, numbers (for example, 22, 23, and 33) are merely used to indicate different positions. For example, R22 and R23 are two same light filters, but are located at different positions.

For a process in which the drive module drives, based on the arrangement manners of light filters in the foregoing case 2, case 3, case 4, case 5, and case 6, the light filtering unit to move, refer to the description of the foregoing case 1. Details are not described herein one by one.

Figure 8:
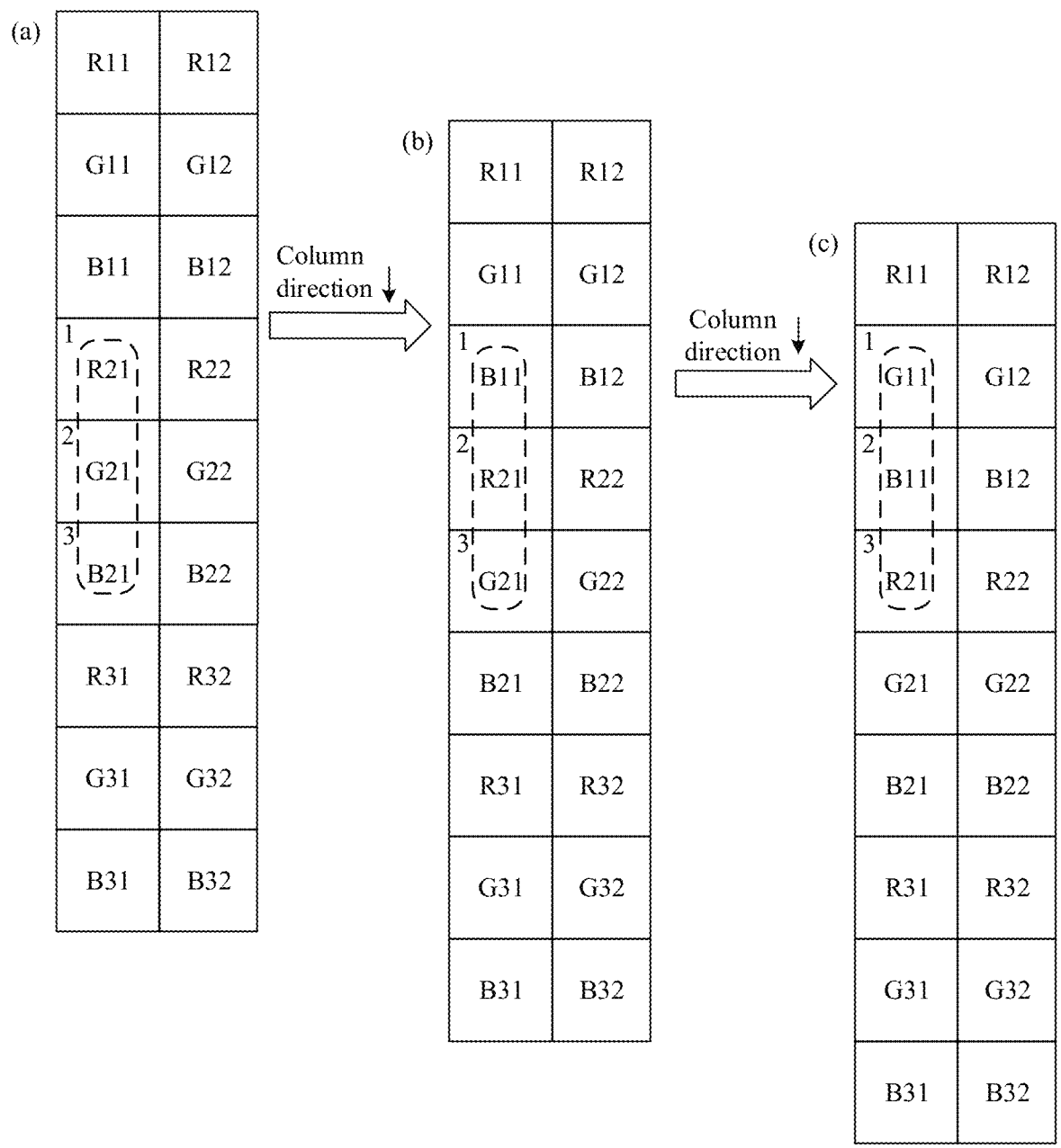
FIG. 8 is a schematic diagram of another process of moving a position of a light filtering unit to correspond to different photosensitive units according to this application.

With reference to the foregoing case 7 and FIG. 6, one photosensitive unit corresponds to three light filtering units, that is, one photosensitive unit corresponds to three light filters RGB. FIG. 8 shows an example of a schematic diagram of another process of moving a position of a light filtering unit to correspond to different photosensitive units according to this application. For example, FIG. 8(a) shows an initial state for reference, in which one photosensitive unit corresponds to one light filtering unit below, and light filtering units R21, G21, and B21 marked by an ellipse correspond to three photosensitive units (a photosensitive unit 1, a photosensitive unit 2, and a photosensitive unit 3) below. The drive module drives the light filtering layer to move by a distance of a side length of one photosensitive unit along a column direction (a negative direction of a Y axis) to obtain a correspondence shown in FIG. 8(b). In the correspondence shown in FIG. 8(b), the photosensitive unit 1 corresponds to B11, the photosensitive unit 2 corresponds to R21, and the photosensitive unit 3 corresponds to G21. The drive module then drives the light filtering layer to move by a distance of a side length of one photosensitive unit along the column direction (the negative direction of the Y axis) to obtain a correspondence shown in FIG. 8(c). In the correspondence shown in FIG. 8(c), the photosensitive unit 1 corresponds to G11, the photosensitive unit 2 corresponds to B11, and the photosensitive unit 3 corresponds to R21. In a process in which the drive module drives the light filtering layer to switch from a position in FIG. 8(a) to a position in FIG. 8(b), and then switch to a position in FIG. 8(c), the photosensitive unit 1 respectively corresponds to R21, B11, and G11, that is, the photosensitive unit 1 may receive a red light signal from R21, a green light signal from G11, and a blue light signal from B11. The photosensitive unit 2 respectively corresponds to G21, R21, and B11, that is, the photosensitive unit 2 may receive a green light signal from G21, a red light signal from R21, and a blue light signal from B11. The photosensitive unit 3 respectively corresponds to B21, G21, and R21, that is, the photosensitive unit 3 may respectively receive a blue light signal from B21, a green light signal from G21, and a red light signal from R21. That is, each marked photosensitive unit may receive one red light signal, one blue light signal, and one green light signal.

For a process in which the drive module drives, based on the arrangement manner of light filters in the foregoing case 8, the light filtering unit to move, refer to the description of the foregoing case 7. Details are not described herein one by one.

Based on the arrangement manners of light filters in the foregoing case 7 and case 8, the drive module may drive the light filtering layer to move in a column direction or a row direction. That is, the drive module may drive the light filtering layer to move in a direction of a single axis. With reference to FIG. 5g, the drive module drives the light filtering layer to move the position in a direction perpendicular to a stripe formed by same light filters. In addition, full color sampling requires to collect only light signals filtered by three light filtering units, thereby helping reduce a time for image photographing by the camera module.

In another possible implementation, the drive module may drive the light filtering unit to move between K regions along a plane parallel to the image sensor, where a movement distance between two adjacent regions is less than a distance between geometric centers of two adjacent photosensitive units. For the distance between geometric centers of two adjacent photosensitive units, refer to the description in FIG. 1a.

Figure 10:
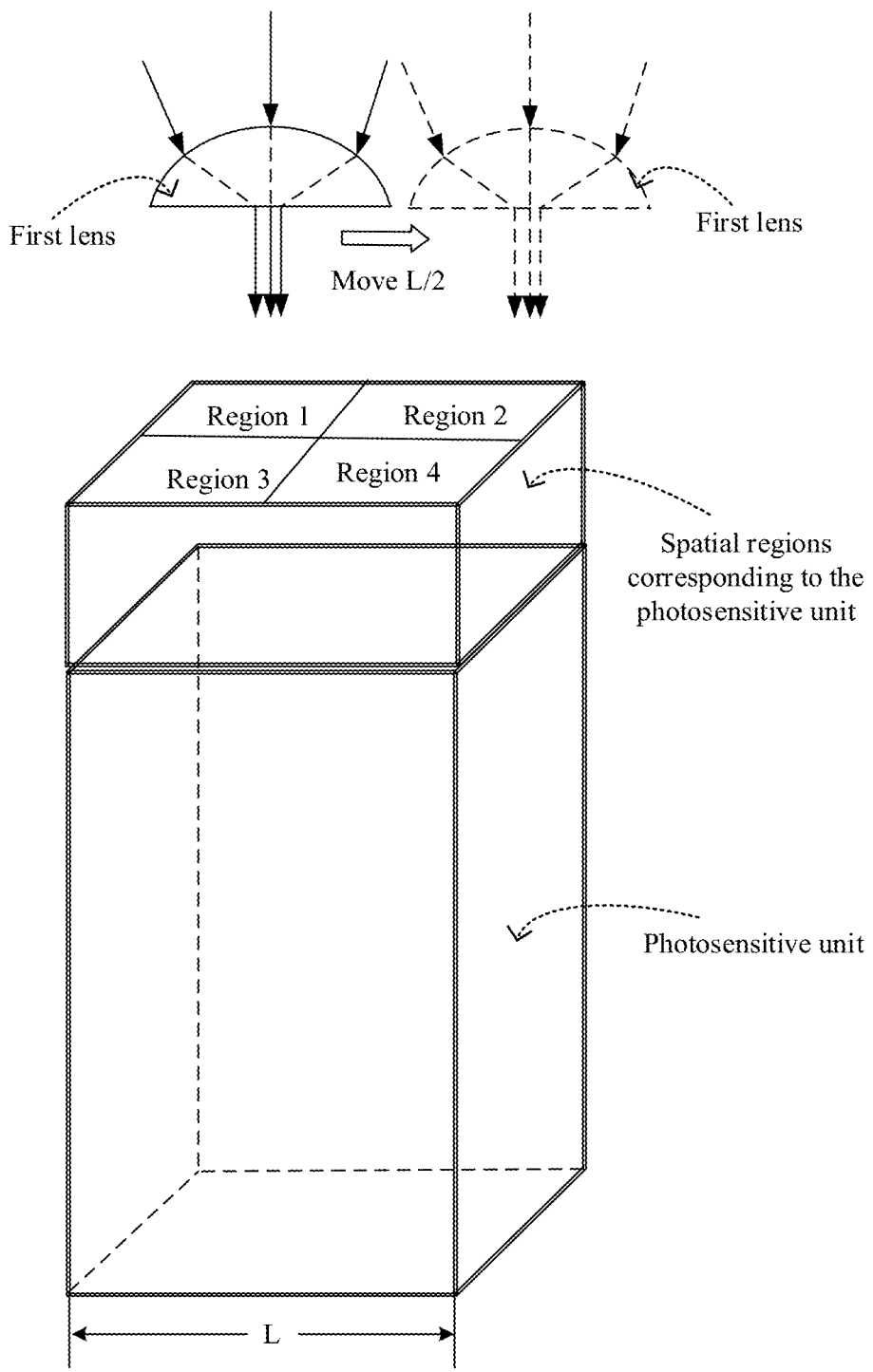
FIG. 10 is a schematic diagram of a process of moving a first lens between K regions according to this application.

Further, optionally, K is a square of an integer greater than 1. The light filtering unit may be configured to: under the drive of the drive module, move between the K regions along the plane parallel to the image sensor, where the movement distance between two adjacent regions is less than or equal to $1/\sqrt{K}$ multiplied by the size of the photosensitive unit. Refer to the following description in FIG. 10. A first lens in the description in FIG. 10 is replaced with a photosensitive unit. Details are not described herein one by one.

In an optional implementation, the drive module may alternatively drive the light filtering layer to rotate by an angle on a plane perpendicular to the image sensor. Alternatively, it may be understood that, rotation is performed by using a Z axis as a rotation axis, to correct a tilt deviation and a rotation deviation of the light filtering layer, so that an image with a better effect can be formed.

In this application, a driving manner of the drive module includes, but is not limited to, electrostatic driving, voltage driving, thermoelectric driving, magnetoelectric driving, shape memory alloy (SMA) driving, motor driving, or the like. For example, the drive module may be a micro-electromechanical system (MEMS) drive, a motor, or a servo motor. In an optional implementation, the drive module may drive, under the control of an electrical signal from a circuit board, the light filtering unit to switch from one photosensitive unit to another photosensitive unit.

4. Image Sensor

In this application, the photosensitive unit may be configured to: receive light signals respectively transmitted from at least three corresponding different light filtering units, to obtain P light signals, and perform optical-to-electrical conversion on the P light signals to obtain electrical signals, to form an image.

Based on the foregoing case 1, one photosensitive unit corresponds to four light filtering units, that is, one photosensitive unit corresponds to four light filters RGGB. The photosensitive unit may receive light signals respectively transmitted from the four light filters RGGB. The R light filter may transmit a red light signal to the photosensitive unit, each G light filter may transmit a green light signal to the photosensitive unit, and the B light filter may transmit a blue light signal to the photosensitive unit. The photosensitive unit may receive light signals respectively transmitted from the four corresponding light filters RGGB, that is, the photosensitive unit may receive one red light signal, two green light signals, and one blue light signal. In this way, the photosensitive unit may collect the full color from the photographed object, thereby helping improve accuracy of light beam collection performed by the photosensitive unit on the photographed object.

Based on the foregoing case 2, one photosensitive unit corresponds to four light filtering units, that is, one photosensitive unit corresponds to four light filters RYYB. The photosensitive unit may receive light signals respectively transmitted from the four light filters RYYB. The R light filter may transmit a red light signal to the photosensitive unit, each Y light filter may transmit a green light signal and a red light signal to the photosensitive unit, and the B light filter may transmit a blue light signal to the photosensitive unit. The photosensitive unit may receive light signals respectively transmitted from the four corresponding light filters RYYB, that is, the photosensitive unit may receive three red light signals, two green light signals, and one blue light signal. In this way, the photosensitive unit may also collect the full color from the photographed object, thereby improving accuracy of light beam collection performed by the photosensitive unit on the photographed object.

Based on the foregoing case 3, one photosensitive unit corresponds to four light filtering units, that is, one photosensitive unit corresponds to four light filters RGBW. The photosensitive unit may receive light signals respectively transmitted from the four light filters RGBW. The R light filter may transmit a red light signal to the photosensitive unit, the G light filter may transmit a green light signal to the photosensitive unit, the B light filter may transmit a blue light signal to the photosensitive unit, and the W light filter may transmit a 100% white light signal to the photosensitive unit. The photosensitive unit may receive light signals respectively transmitted from the four corresponding light filters RGBW, that is, the photosensitive unit may receive one red light signal, one green light signal, one blue light signal, and one white light signal. In this way, the photosensitive unit may also collect the full color from the photographed object, thereby helping improve accuracy of light beam collection performed by the photosensitive unit on the photographed object. In addition, in an environment with extreme low luminance, an amount of light entering the image sensor can be increased.

Based on the foregoing case 4, one photosensitive unit may receive two red light signals, one green light signal, one blue light signal, and one 100% white light signal.

Based on the foregoing case 5, one photosensitive unit may receive one red light signal, one green light signal, one blue light signal, one 100% white light signal, one white light signal (25%) reduced white light signal, and one near-infrared light signal. In this way, the photosensitive unit may also collect the full color from the photographed object, thereby helping improve accuracy of light beam collection performed by the photosensitive unit on the photographed object. In an environment with extreme high luminance, an amount of light entering the image sensor can be reduced. In addition, a unique image in a NIR band can be obtained.

Based on the foregoing case 6, one photosensitive unit may receive two red light signals, one green light signal, one blue light signal, one 100% white light signal, one white light (25%) reduced white light signal, and one near-infrared light signal.

Based on the foregoing case 7, one photosensitive unit may receive one red light signal, one green light signal, and one blue light signal. In this way, the photosensitive unit may also collect the full color from the photographed object, thereby helping improve accuracy of light beam collection performed by the photosensitive unit on the photographed object.

Based on the foregoing case 8, one photosensitive unit may receive two red light signals, one green light signal, and one blue light signal. In this way, the photosensitive unit may also collect the full color from the photographed object, thereby helping improve accuracy of light beam collection performed by the photosensitive unit on the photographed object.

Based on the foregoing case 9, when corresponding to the particular light filter, the photosensitive unit may further receive a particular light signal filtered by the particular light filter, and may output intensity of the particular light signal, so that the particular light signal can be detected.

In an optional implementation, the photosensitive unit may include one or more pixels. When the photosensitive unit includes one pixel, one light filtering unit corresponds to one pixel. When the photosensitive unit includes a plurality of pixels, one light filtering unit corresponds to a plurality of pixels, each pixel may collect a light signal transmitted by the light filtering unit, and the plurality of pixels may output one or more results. A same light signal may be detected by using a plurality of pixels, so that a signal-to-noise ratio of a detected light signal can be effectively improved.

In an optional implementation, the photosensitive unit may be a photodetector (PD), a high-speed photodiode, a charge coupled device (CCD), or a complementary metal-oxide-semiconductor (CMOS) phototransistor. In an optional implementation, the image sensor converts a light signal into an electrical signal, and then transmits the electrical signal to an ISP to convert the electrical signal into a digital image signal.

In this application, the image sensor may be a black-and-white image sensor. The black-and-white image sensor is currently relatively mature, and the camera module may directly use an existing mature black-and-white image sensor, so that costs of the camera module can be reduced.

Figure 9:
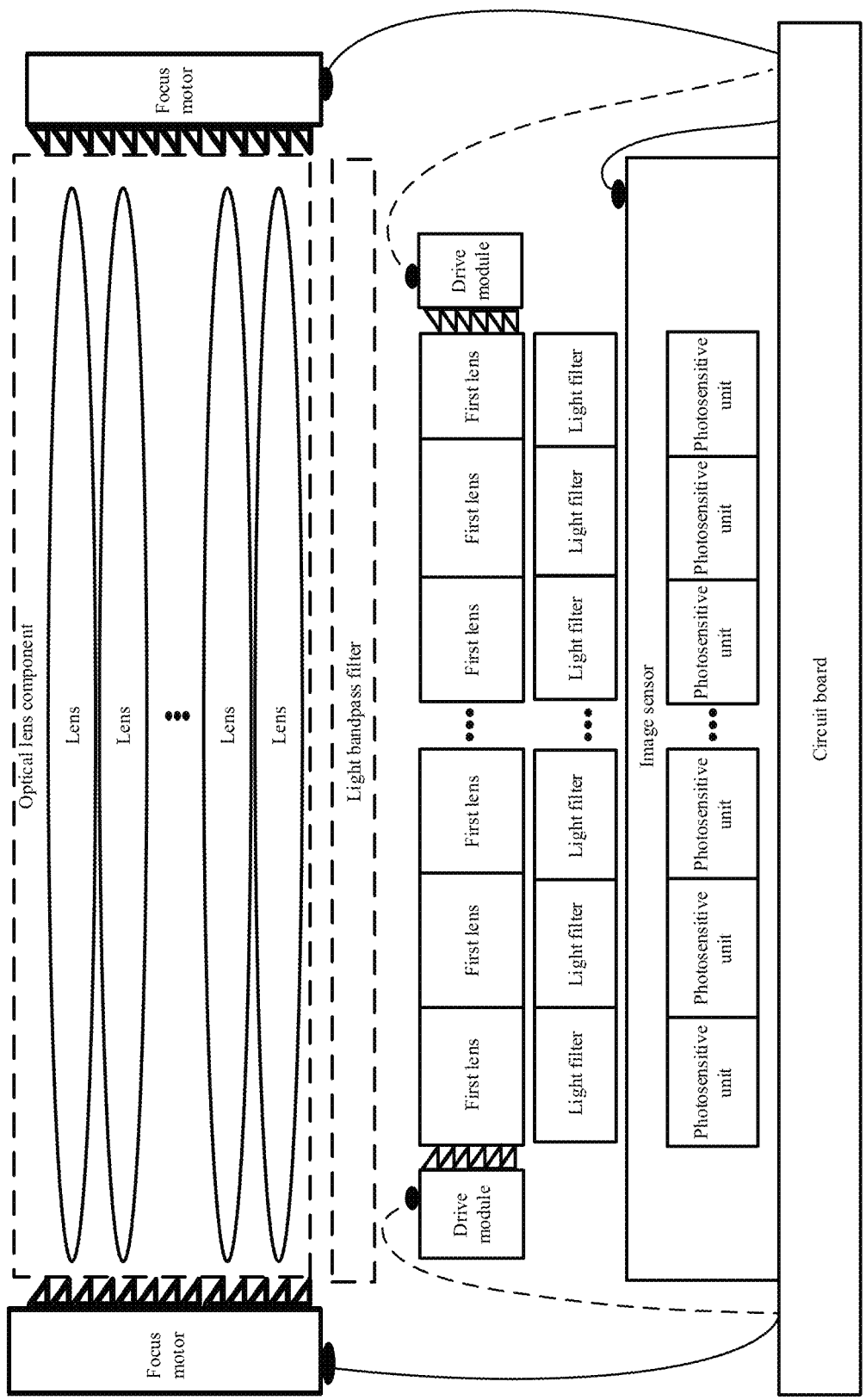
FIG. 9 is a schematic diagram of a structure of another camera module according to this application.

FIG. 9 is a schematic diagram of a structure of another camera module according to this application. The camera module may include an optical lens component, M first lenses, M light filters, an image sensor, and a drive module. One light filter allows light signals within at least one wavelength range to be filtered, the image sensor includes N photosensitive units, one first lens corresponds to one photosensitive unit, one photosensitive unit corresponds to one light filter, and both N and M are integers greater than 2. The optical lens component is configured to receive a light beam from a photographed object, and transmit the light beam to the M first lenses. The first lens is configured to converge the light beam from the optical lens component, move between K regions under the drive of the drive module, and transmit light signals at K different spatial positions that are obtained in the K regions to the corresponding light filter, where K is an integer greater than 1. The light filter is configured to filter the light signals from the corresponding first lens, and transmit filtered light signals to the corresponding photosensitive unit. The photosensitive unit is configured to receive the light signals at the K different spatial positions from the corresponding light filter, and determine image information based on the light signals at the K different spatial positions.

Based on the foregoing camera module, the first lens moves between the K regions under the drive of the drive module, so that one photosensitive unit may receive light signals at K different spatial positions from a corresponding light filter, thereby increasing a frequency of the photosensitive unit in light signal sampling at a spatial position, and helping improve a resolution of an image of the photographed object. In other words, the camera module may complete sampling at different physical spatial positions by using a same photosensitive unit, thereby increasing a sampling frequency at a spatial position.

It should be noted that, the K regions are K different spatial regions, and intensity of light signals corresponding to the K different spatial regions may be different. For each of the light signals at the K different spatial positions from the first lens, the light filter may allow a light signal within at least one wavelength range in the light signals to be filtered. In addition, a light signal filtered by a light filter is always input into a photosensitive unit corresponding to the light filter.

In an optional implementation, the first lens is configured to: under the drive of the drive module, move between the K regions along a plane parallel to the image sensor, where a movement distance between two adjacent regions is less than a distance between geometric centers of two adjacent photosensitive units.

Further, optionally, K is a square of an integer greater than 1. The first lens may be configured to: under the drive of the drive module, move between the K regions along the plane parallel to the image sensor, where the movement distance between two adjacent regions is less than or equal to $1/\sqrt{K}$ multiplied by a size of a photosensitive unit. Referring to FIG. 10, for example, the photosensitive unit is square. A side length is L, a space corresponding to one photosensitive unit is divided into four regions, and a size of the photosensitive unit is the side length L of the photosensitive unit. Then, the drive module may drive the first lens to move by a distance less than or equal to $L*1/\sqrt{K}=L*\frac{1}{2}$ of the photosensitive unit. FIG. 10 is described by using an example in which the distance by which the drive module drives the first lens to move is L/2.

Based on the camera module shown in FIG. 9, there may be the following two possible structures depending on a position of the light filter.

Structure 1: The light filter is located on a surface that is of the first lens and that is opposite to the image sensor.

In other words, the light filter is fixed to the first lens. The drive module may drive the first lens and the light filter together to move between the K regions. Based on the structure 1, for a position relationship between the first lens and the light filter, refer to the descriptions in FIG. 3a and FIG. 3c. Details are not described herein again.

Based on the camera module shown in FIG. 9, the camera module further includes M second lenses, and one second lens corresponds to one light filter. For a position relationship between the second lens, the light filter, and the first lens, refer to the description in FIG. 3b. Details are not described herein again one by one.

In an optional implementation, a center of the second lens is aligned with the center of the light filter.

It should be noted that the structure 1 may be consistent with the structure of the camera module shown in FIG. 2b and the optional implementation, except as follows: Based on the structure 1, the drive module drives the light filter and the first lens together to move between the K regions, and the obtained light signals at the K spatial positions are transmitted to one photosensitive unit. In FIG. 2b and the optional implementation, the drive module drives the light filtering unit to move the position, to correspond to different photosensitive units, and the light filtering unit respectively transmits the filtered light signals to the different photosensitive units.

Based on the foregoing structure 1, the image sensor may be a black-and-white image sensor. An existing black-and-white image sensor that is relatively mature may be used, so that costs of the camera module can be reduced.

Structure 2: The light filter is located on a surface that is of the photosensitive unit and that is opposite to the optical lens component.

In other words, the light filter and the photosensitive unit are disposed together. When the drive module drives the first lens to move between the K regions, the light filter remains stationary.

Figure 11:
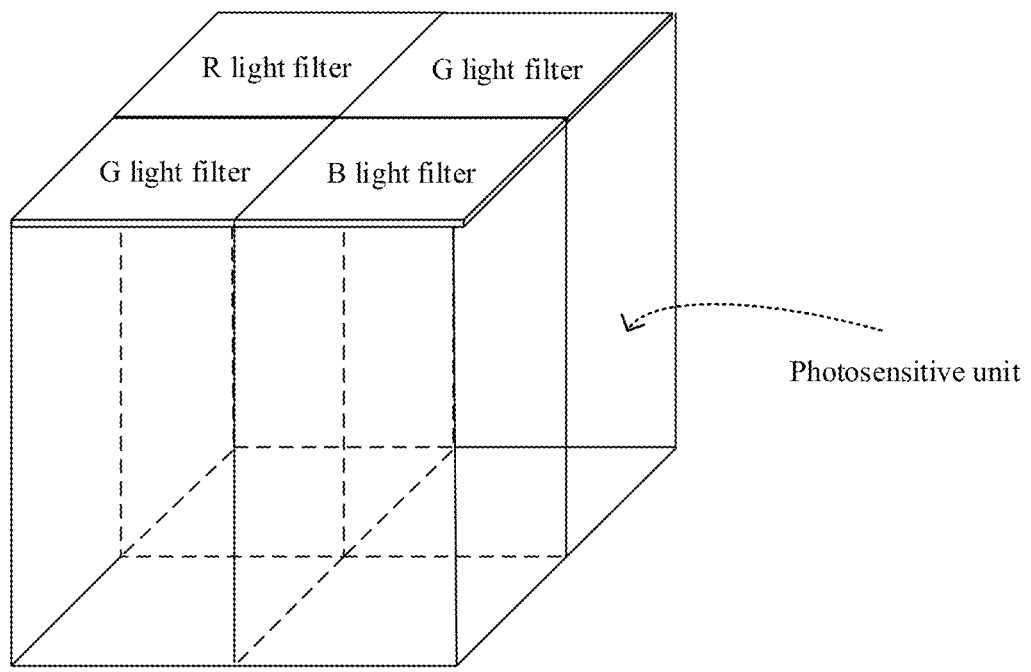
FIG. 11 is a schematic diagram of a position relationship between a light filter and a photosensitive unit according to this application.

FIG. 11 is a schematic diagram of a position relationship between a light filter and a photosensitive unit according to this application. The light filter is located on a surface that is of the photosensitive unit and that is opposite to the optical lens component. FIG. 11 is described by using the four light filters RGGB in the foregoing case 1 are used as an example. One light filter is located on a surface that is of one photosensitive unit and that is opposite to the optical lens component. For example, a size of the light filter may be consistent with a size of the photosensitive unit.

Figure 12A:
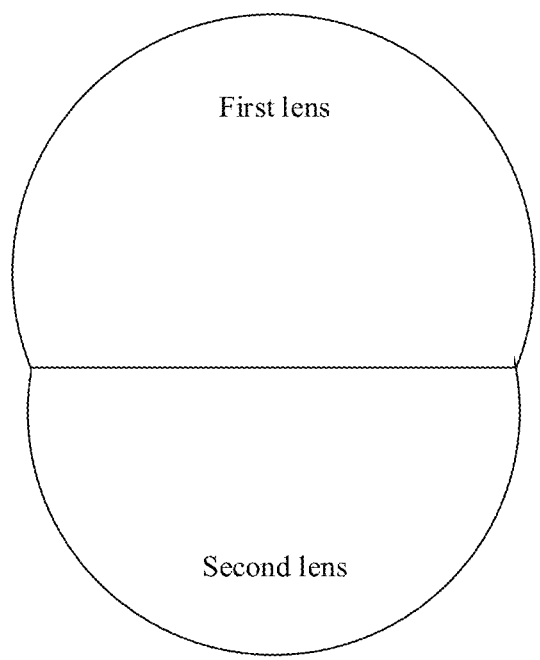
FIG. 12a is a schematic diagram of a position relationship between a first lens and a second lens according to this application.

Based on the structure 2, the camera module may further include M second lenses, and one second lens corresponds to one first lens. FIG. 12a is a schematic diagram of a position relationship between a first lens and a second lens according to this application. The second lens is located on a surface that is of the first lens and that is opposite to the image sensor. The second lens is configured to receive converged light from the corresponding first lens, further converge the converged light, and transmit further converged light to a corresponding light filter.

Figure 12B:
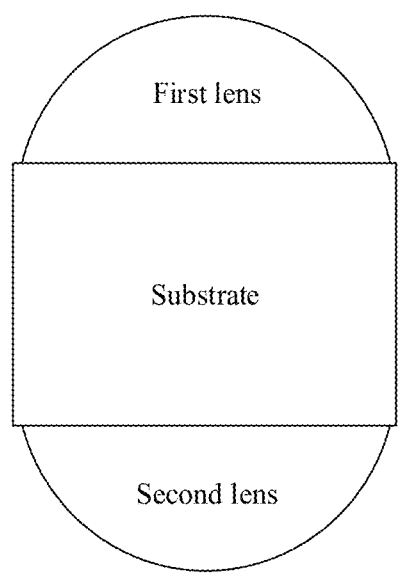
FIG. 12b is a schematic diagram of another position relationship between a first lens and a second lens according to this application.

FIG. 12b is a schematic diagram of another position relationship between a first lens and a second lens according to this application. A transparent substrate is disposed between the first lens and the second lens. Alternatively, it may be understood that, the first lens and the second lens are located on two opposite surfaces of the transparent substrate. The transparent substrate may be glass.

Figure 12C:
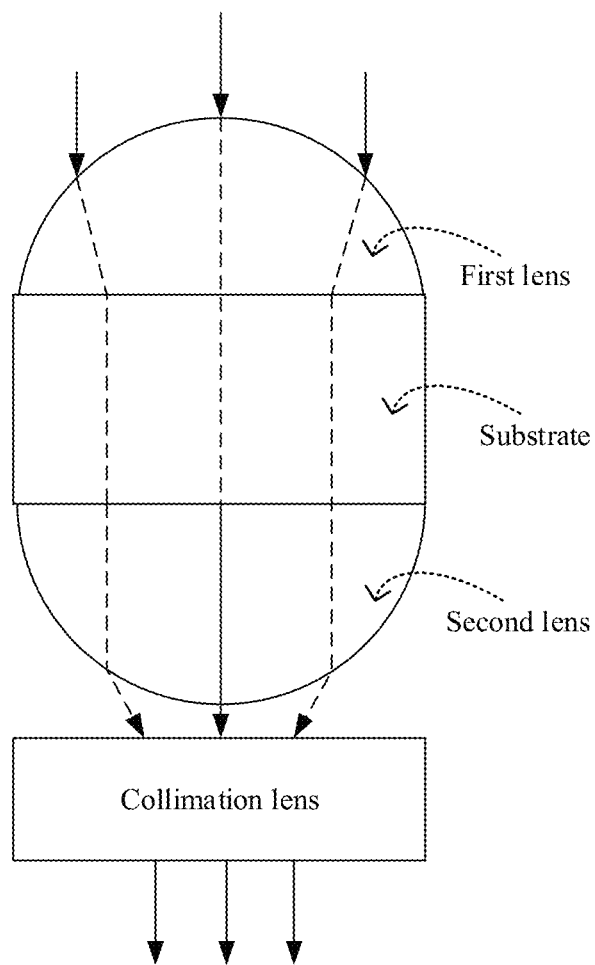
FIG. 12c is a schematic diagram of a position relationship and a light path between a first lens, a second lens, and a collimation lens according to this application.

Based on the structure 2, the camera module may further include M collimation lenses, and one collimation lens corresponds to one first lens. FIG. 12c is a schematic diagram of a position relationship and a light path between a first lens, a second lens, and a collimation lens according to this application. The collimation lens is located between the first lens and a photosensitive unit, and the collimation lens is configured to collimate converged light from the first lens, and transmit collimated light to a corresponding photosensitive unit. With the collimation lens, an output light signal can be closer to parallel light.

It should be noted that, the collimation lens shown in FIG. 12c may alternatively be located between the first lens and the optical lens component, and the collimation lens is configured to collimate the light beam from the optical lens component, and transmit collimated light to the corresponding first lens.

It may be understood that, after the light beam from the optical lens component passes through the structure shown in FIG. 12a, FIG. 12b, or FIG. 12c, a collimated and converged light beam may be formed, and the collimated and converged light beam is transmitted to a corresponding light filter. Certainly, the camera module in this application may alternatively include more lenses, to converge and collimate the light beam from the photographed object. A quantity of lenses is not limited in this application.

In the structure 2, the M light filters may be repeatedly arranged in any one of the following manners.

Manner 1: Four light filters are RGGB, and RGGB form a 2*2 array. For details, refer to the description of the foregoing case 1.

Manner 2: Four light filters are RYYB, and RYYB form a 2*2 array. For details, refer to the description of the foregoing case 2.

Manner 3: Four light filters are RGBW, and RGBW form a 2*2 array. For details, refer to the description of the foregoing case 3.

Manner 4: Four light filters are RYBW, and RYBW form a 2*2 array. For details, refer to the description of the foregoing case 4.

Based on the foregoing manner 3 and manner 4, with a W light filter, in a scenario with relatively low ambient luminance, an amount of light entering the image sensor in the camera module can be increased for synthesis into a low-light image of higher quality.

Manner 5: Six light filters are RGBWW-(NIR), and RGBWW-(NIR) form a 3*2 array or a 2*3 array. For details, refer to the description of the foregoing case 5.

Manner 6: Six light filters are RYBWW-(NIR), and RYBWW-(NIR) form a 3*2 array or a 2*3 array. For details, refer to the description of the foregoing case 6.

Based on the foregoing manner 5 and manner 6, a W light filter is disposed, so that in a scenario with relatively low ambient luminance, an amount of light entering the image sensor in the camera module can be increased. A W− light filter is disposed, so that based on a light attenuation characteristic of the W− light filter, an amount of light entering the image sensor in the camera module can be reduced in an extremely bright environment. A combination of the W light filter and the W− light filter can achieve dynamic range representation of a higher range in an environment with a high light ratio. A NIR light filter is disposed, so that a unique image in a NIR band can be obtained.

Manner 7: Three light filters are RGB, and RGB form a 1*3 array or a 3*1 array. For details, refer to the description of the foregoing case 7.

Manner 8: Three light filters are RYB, and RYB form a 1*3 array or a 3*1 array. For details, refer to the description of the foregoing case 8.

Manner 9: Based on any one of the foregoing manner 1 to manner 8, some of the M light filters are particular light filters that allow particular light signals to be filtered, and the particular light filters are arranged in a light filtering layer according to a preset rule. For details, refer to the description of the foregoing case 9. Details are not described herein again one by one.

Based on the foregoing manner 9, further, optionally, the preset rule includes arrangement at equal intervals; or the preset rule includes that the light filtering layer is divided into at least two regions, arrangement is performed at equal intervals in each region, and intervals corresponding to the at least two regions are different or the same.

Alternatively, an arrangement manner of the light filters may be any manner in the foregoing case 1 to case 9. For details, refer to the foregoing description. Details are not described herein again one by one.

It should be noted that, in the structure 2, to facilitate packaging of the camera module, M is generally an integer equal to N.

Based on the foregoing structure 2, the image sensor may be a black-and-white image sensor or a color image sensor. The color image sensor is a combination of the light filter and the photosensitive unit in the structure 2.

In any one of the foregoing embodiments, the camera module may further include a light bandpass filter (refer to FIG. 2b or FIG. 9). The light bandpass filter is a piece of planar glass or a glass-like resin material, which blocks or absorbs light of a particular wavelength through surface coating or material doping, and transmits light of a specified wavelength, to implement a function of selectively allowing light of different wavelengths to pass.

Based on the foregoing structure and functional principle of the camera module, this application may further provide a camera. The camera may include the camera module and a fixing structure, and the fixing structure is configured to fix the camera module. Certainly, other components such as a processor or a memory may be further included. In other words, any camera having a photographing function may use the camera module provided in this application.

Based on the foregoing structure and functional principle of the camera module, this application may further provide a terminal device. The terminal device may include the camera module and a processor, and the processor may be configured to process image information in the camera module. Certainly, other components such as a memory, a wireless communications apparatus, a sensor, a touchscreen, and a display may be further included.

In this application, the terminal device may be a portable device, for example, a mobile phone, a tablet computer, a wearable device (for example, a smartwatch), or a camera (such as a mirrorless camera). An example embodiment of the portable terminal device includes but is not limited to a portable terminal device using iOS®, Android®, Microsoft®, or another operating system.

Figure 13:
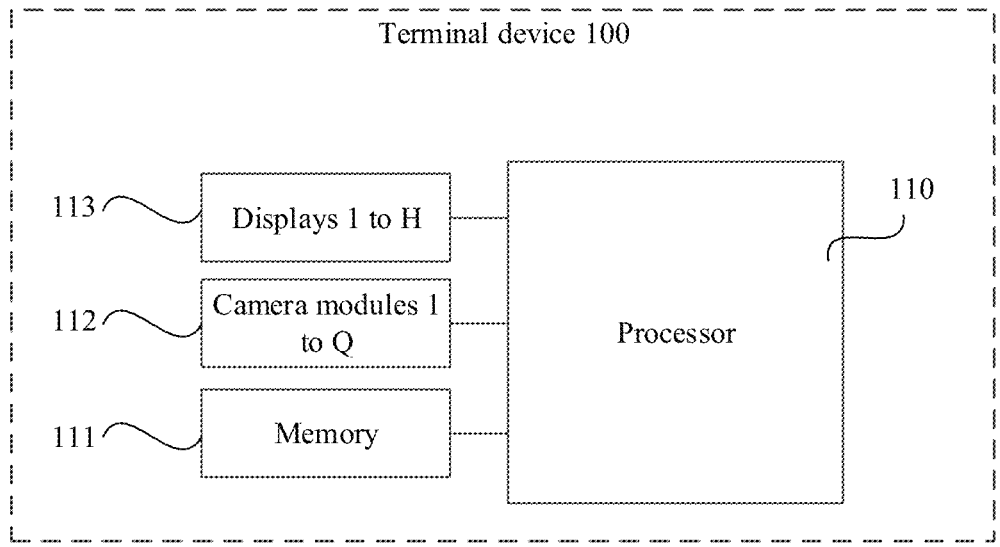
FIG. 13 is a schematic diagram of a structure of a terminal device according to an embodiment of this application.

FIG. 13 is a schematic diagram of a structure of a terminal device according to an embodiment of this application. The terminal device 100 may include a processor 110, a memory 111, a camera module 112, a display 113, and the like. It should be understood that the hardware structure shown in FIG. 13 is merely an example. The terminal device to which this application is applicable may have more or fewer components than the terminal device 100 shown in FIG. 13, may combine two or more components, or may have different component configurations. Components shown in the figure may be implemented in hardware, software, or a combination of hardware and software that includes one or more signal processing and/or application-specific integrated circuits.

The processor 110 may include one or more processing units. For example, the processor 110 may include an application processor (AP), a graphics processing unit (GPU), an image signal processor (ISP), a controller, and a digital signal processor (DSP). Different processing units may be independent components, or may be integrated into one or more processors.

The camera module 112 may be configured to capture dynamic and static images and the like. In some embodiments, the terminal device 100 may include one or Q camera modules 112, and Q is a positive integer greater than or equal to 1. For example, the terminal device 100 may include two camera modules 112, one camera module 112 is a front-facing camera module, and the other camera module 112 is a rear-facing camera module. For another example, the terminal device 100 may alternatively include three camera modules 112, one camera module 112 is a front-facing camera module, and the other two camera modules 112 are rear-facing camera modules. Alternatively, one camera module 112 is a rear-facing camera module, and the other two camera modules 112 are front-facing camera modules. For another example, the terminal device 100 includes four camera modules 112, one camera module 112 is a front-facing camera module, and the other three camera modules 112 are rear-facing camera modules.

The display 113 may be configured to display an image, a video, and the like. The display 113 may include a display panel. The display panel may be a liquid crystal display (LCD), an organic light-emitting diode (OLED), an active-matrix organic light emitting diode (AMOLED), a flexible light-emitting diode (FLED), Miniled, MicroLed, MicroOLed, a quantum dot light emitting diode (QLED), or the like. In some embodiments, the terminal device 100 may include one or H displays 113, where H is a positive integer greater than 1. For example, the terminal device 100 may implement a display function by using the GPU, the display 113, the application processor, and the like.

Figure 14:
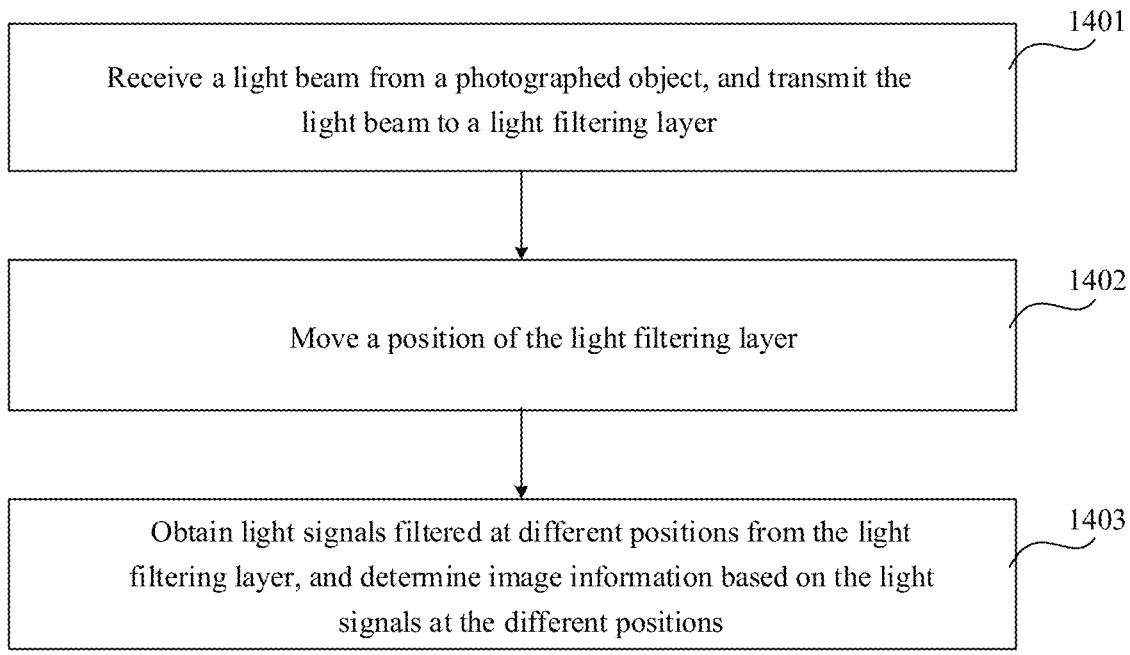
FIG. 14 is a schematic flowchart of a method for determining image information according to an embodiment of this application.

Based on the foregoing content and a same concept, this application provides a method for determining image information, referring to a description in FIG. 14. The method for determining image information may be applied to the camera module in any one of the embodiments shown in FIG. 2b. The camera module includes a light filtering layer. As shown in FIG. 14, the method includes the following steps.

Step 1401: Receive a light beam from a photographed object, and transmit the light beam to the light filtering layer.

This step may be that the optical lens component transmits the light beam from the photographed object to the light filtering units. For a specific process, refer to the description of the optical lens component. Details are not described herein again one by one.

Step 1402: Move a position of the light filtering layer.

This step gives example descriptions of the following two implementations of moving the light filtering layer.

Implementation 1: Positions of M light filtering units are moved, so that each light filtering unit corresponds to different photosensitive units.

In an optional implementation, the light filtering layer includes M light filtering units, the camera module further includes N photosensitive units, one light filtering unit allows light signals within at least one wavelength range to be filtered, one photosensitive unit corresponds to at least three different light filtering units, and both N and M are integers greater than 2. Positions of the light filtering units may be moved, so that each light filtering unit corresponds to different photosensitive units.

In an optional implementation, the light filtering unit may include a light filter. If an arrangement manner of light filters in at least three different light filtering units corresponding to one photosensitive unit is RGGB, RYYB, RGBW, RYBW, RGBWW-(NIR), or RYBWW-(NIR), switching is performed between different photosensitive units in a plane parallel to the N photosensitive units and respectively along a row direction and a column direction of the array. RGGB, RYYB, RGBW, and RYBW are all 2*2 arrays, and RGBWW-(NIR) and RYBWW-(NIR) are both 3*2 arrays or 2*3 arrays. If the arrangement manner of light filters in at least three different light filtering units corresponding to one photosensitive unit is red, green, blue (RGB) or red, yellow, blue (RYB), switching is performed between different photosensitive units in a plane parallel to the N photosensitive units and along a column direction or a row direction of the array. RGB and RYB are both 1*3 arrays or 3*1 arrays. For details, refer to the descriptions of the drive module and the light filtering unit. Details are not described herein again one by one.

Implementation 2: Light filtering units are moved between K regions.

In an optional implementation, the light filtering layer includes M light filtering units, and M is an integer greater than 2. The light filtering units may be moved between the K regions, to obtain light signals at K different spatial positions in the K regions, where K is an integer greater than 1.

In an optional implementation, the camera module may further include N photosensitive units, and N is an integer greater than 2. Movement may be performed between the K regions along a plane parallel to the N photosensitive units, where a movement distance between two adjacent regions is less than a distance between geometric centers of two adjacent photosensitive units.

Step 1403: Obtain light signals filtered at different positions from the light filtering layer, and determine image information based on the light signals at the different positions.

Based on the foregoing implementation 1, the light signals respectively filtered by the at least three corresponding different light filtering units may be obtained, to obtain P light signals, and image information is determined based on the P light signals. P is an integer greater than 2, and wavelength ranges of at least three of the P light signals are different. For a specific process, refer to the description of the photosensitive unit. Details are not described herein again one by one.

In the implementation 1, the positions of the light filtering units are moved, so that each light filtering unit corresponds to different photosensitive units, and P real light signals transmitted by at least three corresponding light filtering units may be obtained. Wavelength ranges of at least three of the P light signals are different. Image information is determined based on the P light signals without a color guessing process, thereby helping improve accuracy of light beam collection performed by the photosensitive unit on the photographed object, and helping avoid a false color caused by a color guessing algorithm. Further, if the at least three different light signals include a red light signal, a green light signal, and a blue light signal, a full color from the photographed object can be obtained.

Based on the foregoing implementation 2, the light signals at the K different spatial positions may be obtained, and image information is determined based on the light signals at the K different spatial positions.

In the implementation 2, the positions of the light filtering units are moved, so that light signals at K different spatial positions may be obtained, thereby increasing a frequency in light signal sampling at a spatial position, and helping further improve a resolution of a formed image of the photographed object.

It can be learned from the foregoing step 1401 to step 1403 that, the position of the light filtering layer is moved, so that light signals filtered by the light filtering layer at different spatial positions are obtained, to complete sampling at different physical spatial positions, thereby increasing a sampling frequency at a spatial position, and helping improve a resolution of an image of the photographed object.

Figure 15:
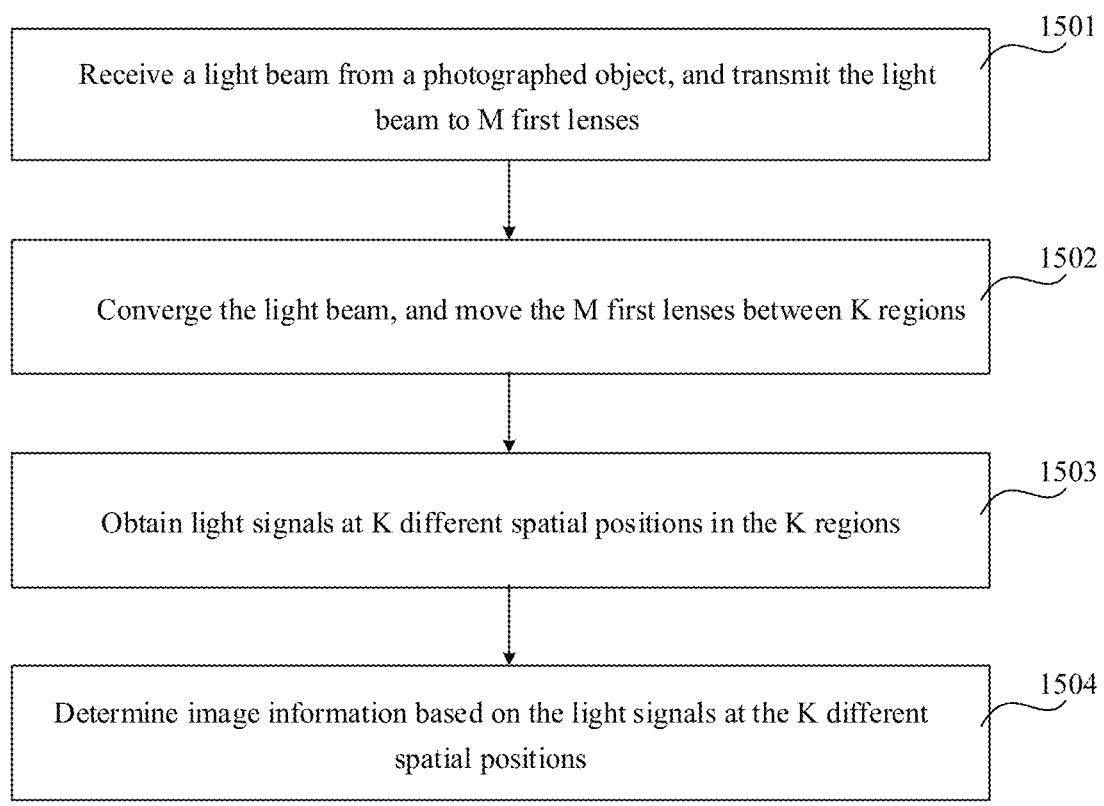
FIG. 15 is a schematic flowchart of another method for determining image information according to an embodiment of this application.

Based on the foregoing content and a same concept, this application provides another method for determining image information, referring to a description in FIG. 15. The method for determining image information may be applied to the camera module in any one of the embodiments shown in FIG. 9. The camera module may include M first lenses, and M is an integer greater than 2. As shown in FIG. 15, the method includes the following steps.

Step 1501: Receive a light beam from a photographed object, and transmit the light beam to the M first lenses.

This step may be that the optical lens component transmits the light beam from the photographed object to the M first lenses. For a specific process, refer to the description of the optical lens component. Details are not described herein again one by one.

Step 1502: Converge the light beam, and move the M first lenses between K regions, where K is an integer greater than 1.

In an optional implementation, the camera module may further include N photosensitive units, and N is an integer greater than 2. Movement may be performed between the K regions along a plane parallel to the N photosensitive units, where a movement distance between two adjacent regions is less than a distance between geometric centers of two adjacent photosensitive units. For a specific process, refer to the description of moving the first lens between the K regions. Details are not described herein again one by one.

Step 1503: Obtain light signals at K different spatial positions in the K regions.

In this step, intensity of the light signals at the K different spatial positions may be different. For details, refer to the description of the camera module based on FIG. 9. Details are not described herein again one by one.

Step 1504: Determine image information based on the light signals at the K different spatial positions.

In an optional implementation, the light signals at the K different spatial positions may be converted into electrical signals, and image information is determined based on the electrical signals obtained after conversion.

It can be learned from the foregoing step 1501 to step 1504 that, the first lenses move between the K regions, so that light signals at K different spatial positions may be obtained, thereby increasing a frequency in light signal sampling at a spatial position, and helping improve a resolution of a formed image of the photographed object.

This application provides a computer-readable storage medium. The computer-readable storage medium stores a computer program or instructions. When the computer program or the instructions are executed by a terminal device, the terminal device is enabled to perform the method in any possible implementation in any one of the foregoing embodiments.

This application provides a computer program product. The computer program product includes a computer program or instructions. When the computer program or the instructions are executed by a terminal device, the method in any one of the foregoing embodiments may be implemented.

This application provides a computer-readable storage medium. The computer-readable storage medium stores a computer program or instructions. When the computer program or the instructions are executed by a camera, the camera is enabled to perform the method in any possible implementation in any one of the foregoing embodiments.

This application provides a computer program product. The computer program product includes a computer program or instructions. When the computer program or the instructions are executed by a camera, the method in the possible implementation in any one of the foregoing embodiments is implemented.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment. For example, the camera module shown in FIG. 2b is used as an example. The light filtering unit is configured to move a position under the drive of the drive module, to correspond to different photosensitive units. Further, when corresponding to each photosensitive unit, the light filtering unit may move between K regions under the drive of the drive module, and transmit all light signals at K different spatial positions that are obtained in the K regions to the corresponding photosensitive unit. The photosensitive unit is configured to receive the light signals at the K different spatial positions that are respectively transmitted from at least three corresponding different light filtering units, to obtain P*K light signals. That is, the photosensitive unit may obtain P*K real light signal within wavelength ranges without a color guessing process, thereby helping improve accuracy of light beam collection performed by the photosensitive unit on the photographed object. In addition, each photosensitive unit may receive light signals at K different spatial positions from a corresponding light filter, thereby increasing a frequency of the photosensitive unit in light signal sampling at a spatial position, and helping improve a resolution of an image of a photographed object.

In this application, "at least one" means one or more, and "a plurality of" means two or more. "And/or" describes an association relationship between associated objects, and represents that three relationships may exist. For example, A and/or B may represent the following cases: A exists alone, both A and B exist, and B exists alone, where A and B may be singular or plural. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural. In the text descriptions of this application, the character "/" usually indicates an "or" relationship between associated objects.

It may be understood that various numbers in the embodiments of this application are merely used for differentiation for ease of description, and are not used to limit the scope of the embodiments of this application. Numbers of the foregoing processes do not mean an execution sequence, and the execution sequence of the processes should be determined based on functions and internal logic of the processes.

In the specification, claims, and the accompanying drawings of this application, the terms "first", "second", and the like are intended to distinguish between similar objects but do not necessarily indicate a specific order or sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and the accompanying drawings are merely example description of the solution defined by the appended claims, and are intended to cover any of or all modifications, variations, combinations or equivalents within the scope of this application.

It is clear that a person skilled in the art can make various modifications and variations to this application without departing from the spirit and the scope of the present invention. This application is also intended to cover these modifications and variations of the embodiments of this application provided that they fall within the scope of protection defined by the following claims and their equivalent technologies.

What is claimed is:

1. A camera module, comprising an optical lens component, a light filtering layer comprising at least one light filtering unit, an image sensor and a drive module, wherein
the optical lens component is configured to receive a light beam from a photographed object, and transmit the light beam to the light filtering layer;
the drive module is configured to move the light filtering layer, along a plane parallel to the image sensor, between K regions, such that the light filtering unit is configured to transmit light signals at K different spatial positions that are obtained in the K regions to corresponding photosensitive units in the image sensor, wherein K is an integer greater than 1, and a movement distance between two adjacent regions is less than a distance between geometric centers of two corresponding adjacent photosensitive units;
the light filtering layer is configured to transmit light signals filtered at different positions to the image sensor; and
the image sensor is configured to receive the light signals filtered at the different positions that are transmitted from the light filtering layer, and determine image information based on the light signals filtered at the different positions.

2. The camera module according to claim 1, wherein the light filtering layer comprises M light filtering units, one light filtering unit allows light signals within at least one wavelength range to be filtered, the image sensor comprises N photosensitive units, one photosensitive unit corresponds to at least three different light filtering units, and both N and M are integers greater than 2;
the drive module is configured to move each light filtering unit to positions under the drive of the drive module corresponding to different photosensitive units, such that each light filtering unit is configured to transmit filtered light signals to the different photosensitive units; and
each photosensitive unit is configured to: receive light signals respectively transmitted from the at least three corresponding different light filtering units, to obtain P light signals, and determine image information based on the P light signals, wherein P is an integer greater than 2, and wavelength ranges of at least three of the P light signals are different.

3. The camera module according to claim 2, wherein each light filtering unit comprises a light filter and a first lens, and the first lens is located on a surface of the light filter and opposite to the optical lens component;
the first lens is configured to converge the light beam from the optical lens component, and transmit a converged light beam to the light filter; and
the light filter is configured to filter the converged light beam, and respectively transmit filtered light signals to the different photosensitive units.

4. The camera module according to claim 3, wherein for a light filtering unit located at a central position of the light filtering layer, a center of the first lens is aligned with a center of the light filter; and
for a light filtering unit located in a region of the light filtering layer other than the central position, a first distance between the center of the light filtering unit and a center of the light filtering layer is greater than a second distance between the center of the first lens and the center of the light filtering layer.

5. The camera module according to claim 1, wherein the light filtering layer comprises M light filtering units, one light filtering unit allows light signals within at least one wavelength range to be filtered, the image sensor comprises N photosensitive units, one photosensitive unit corresponds to one light filtering unit, and both N and M are integers greater than 2; and
at least one of the photosensitive units is configured to receive the light signals at the K different spatial positions from corresponding light filtering units, and determine image information based on the light signals at the K different spatial positions.

6. The camera module according to claim 5, wherein each light filtering unit comprises a light filter and a first lens, and the first lens is located on a surface that is of the light filter and that is opposite to the optical lens component;
the first lens is configured to converge the light beam from the optical lens component, and transmit a converged light beam to the light filter; and
the light filter is configured to filter the converged light beam from the first lens, and transmit filtered light signals to the corresponding photosensitive unit.

7. The camera module according to claim 6, wherein for a light filtering unit is located at a central position of the light filtering layer, a center of the first lens is aligned with a center of the light filter; and
for a light filtering unit is located in a region of the light filtering layer other than the central position, a first distance between the center of the light filtering unit and a center of the light filtering layer is greater than a second distance between the center of the first lens and the center of the light filtering layer.

8. The camera module according to claim 7, wherein a difference between the first distance and the second distance, when the light filtering unit is at a first position, is less than a difference between the first distance and the second distance, when the light filtering unit is at a second position, wherein a distance between the first position and the center of the light filtering layer is less than a distance between the second position and the center of the light filtering layer.

9. The camera module according to claim 6, wherein the camera module further comprises a second lens, and the second lens is located on a surface of the light filter and opposite to the image sensor; and
the second lens is configured to receive light signals from the corresponding light filter, converge the light signals, and transmit converged light signals to the corresponding photosensitive unit.

10. The camera module according to claim 9, wherein a center of the second lens is aligned with the center of the light filter.

11. The camera module according to claim 1, wherein the light filtering layer further comprises particular light filters disposed according to a preset rule, and the particular light filters allow particular light signals to be filtered.

12. The camera module according to claim 11, wherein the preset rule comprises spatial arrangement at equal intervals; or the preset rule comprises that the light filtering layer is divided into at least two regions, arrangement is performed at equal intervals in each region, and intervals corresponding to the at least two regions are different or the same.

13. The camera module according to claim 1, wherein the image sensor is a black-and-white image sensor.

14. A method for determining image information, wherein the method is applied to a camera module, the camera module comprises a light filtering layer comprising at least one light filtering unit, and the method comprises:
   receiving a light beam from a photographed object, and transmitting the light beam to the light filtering layer;
   moving a position of the light filtering layer, along a plane parallel to the image sensor, between K regions, such that the light filtering unit transmits light signals at K different spatial positions that are obtained in the K regions to corresponding photosensitive units in the image sensor, wherein K is an integer greater than 1, and a movement distance between two adjacent regions is less than a distance between geometric centers of two corresponding adjacent photosensitive units; and
   obtaining light signals filtered at different positions from the light filtering layer, and determining image information based on the light signals at the different positions.

15. The method according to claim 14, wherein the light filtering layer comprises M light filtering units, and M is an integer greater than 2;
   the moving the position of the light filtering layer comprises moving the light filtering units between K regions; and
   the obtaining light signals filtered at different positions from the light filtering layer, and determining image information based on the light signals at the different positions comprises:
      obtaining light signals at K different spatial positions in the K regions, wherein K is an integer greater than 1; and
      determining image information based on the light signals at the K different spatial positions.

16. The method according to claim 15, wherein the camera module further comprises N photosensitive units, and N is an integer greater than 2; and
   the moving the light filtering units between K regions comprises moving between the K regions along a plane parallel to the N photosensitive units, wherein a movement distance between two adjacent regions is less than a distance between geometric centers of two adjacent photosensitive units.

17. A camera, comprising the camera module according to claim 1 and a fixing structure, wherein the fixing structure is configured to fix the camera module.

18. A terminal device, comprising a processor and the camera module according to claim 1, wherein the processor is configured to process image information in the camera module.

19. A computer-readable storage medium, wherein the computer-readable storage medium stores a computer program or instructions, and when the computer program or the instructions is/are executed by a terminal device, the terminal device is configured to perform the following steps:
   receiving a light beam from a photographed object, and transmitting the light beam to the light filtering layer comprising at least one light filtering unit;
   moving a position of the light filtering layer, along a plane parallel to the image sensor, between K regions, such that the light filtering unit transmits light signals at K different spatial positions that are obtained in the K regions to corresponding photosensitive units in the image sensor, wherein K is an integer greater than 1, and a movement distance between two adjacent regions is less than a distance between geometric centers of two corresponding adjacent photosensitive units; and
   obtaining light signals filtered at different positions from the light filtering layer, and determining image information based on the light signals at the different positions.

* * * * *